(12) United States Patent
Esposito

(10) Patent No.: US 10,529,239 B2
(45) Date of Patent: Jan. 7, 2020

(54) AIR TRAFFIC AND WEATHER DATA AGGREGATING AND DE-CONFLICTING

(71) Applicant: Honeywell International Inc., Morris Plains, NJ (US)

(72) Inventor: Carl Esposito, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 127 days.

(21) Appl. No.: 15/237,488

(22) Filed: Aug. 15, 2016

(65) Prior Publication Data

US 2018/0047294 A1 Feb. 15, 2018

(51) Int. Cl.
| | |
|---|---|
| *G06F 19/00* | (2018.01) |
| *G08G 5/00* | (2006.01) |
| *H04B 7/185* | (2006.01) |

(52) U.S. Cl.
CPC ......... *G08G 5/0008* (2013.01); *G08G 5/0004* (2013.01); *G08G 5/0013* (2013.01); *G08G 5/0021* (2013.01); *G08G 5/0052* (2013.01); *G08G 5/0091* (2013.01); *H04B 7/18506* (2013.01)

(58) Field of Classification Search
CPC .. G08G 5/0008; G08G 5/0013; G08G 5/0091; H04B 7/18506
USPC .......................................................... 701/14
See application file for complete search history.

(56) References Cited

U.S. PATENT DOCUMENTS

| | | | |
|---|---|---|---|
| 5,111,400 A | 5/1992 | Yoder | |
| 6,058,307 A * | 5/2000 | Garner | H04B 7/18539 455/428 |
| 6,545,601 B1 * | 4/2003 | Monroe | B64D 45/0015 340/3.1 |
| 6,828,922 B1 | 12/2004 | Gremmert et al. | |
| 7,148,816 B1 | 12/2006 | Carrico | |
| 8,040,258 B2 | 10/2011 | Ibrahim et al. | |

(Continued)

FOREIGN PATENT DOCUMENTS

| | | |
|---|---|---|
| CN | 102682627 A | 9/2012 |
| EP | 2157452 A2 | 2/2010 |

(Continued)

OTHER PUBLICATIONS

Extended European Search Report from counterpart European Patent Application No. 17181563.2, dated Jan. 9, 2018, 9 pp.

(Continued)

*Primary Examiner* — Ronnie M Mancho
(74) *Attorney, Agent, or Firm* — Shumaker & Sieffert, P.A.

(57) ABSTRACT

In some examples, a system is configured to receive composite air traffic radio surveillance data from one or more relaying aircraft, the composite air traffic radio surveillance data comprising air traffic radio surveillance data from the one or more relaying aircraft and air traffic radio surveillance data relayed by the one or more relaying aircraft from one or more additional aircraft. The system is further configured to receive data from one or more non-aircraft data sources, and aggregate and de-conflict the composite air traffic radio surveillance data and the data from the one or more non-aircraft data sources, thereby generating an aggregated and de-conflicted data set. The system is further configured to generate an output based at least in part on the aggregated and de-conflicted data set.

20 Claims, 8 Drawing Sheets

(56) References Cited

U.S. PATENT DOCUMENTS

| | | |
|---|---|---|
| 9,274,521 B1 | 3/2016 | Stefani et al. |
| 9,405,005 B1* | 8/2016 | Arteaga .................. G01S 13/91 |
| 2005/0007272 A1* | 1/2005 | Smith ....................... G01S 5/06 |
| | | 342/189 |
| 2008/0036659 A1* | 2/2008 | Smith .................. G01S 13/765 |
| | | 342/454 |
| 2009/0134981 A1* | 5/2009 | Shafaat ................ G08G 5/0008 |
| | | 340/313 |
| 2009/0322589 A1 | 12/2009 | Dooley |
| 2012/0319871 A1 | 12/2012 | Wise |
| 2014/0002293 A1 | 1/2014 | Behrens et al. |
| 2014/0197982 A1 | 7/2014 | Wang et al. |
| 2016/0035225 A1* | 2/2016 | Berckefeldt ......... G08G 5/0078 |
| | | 342/32 |
| 2017/0069214 A1* | 3/2017 | Dupray ................ G08G 5/0021 |
| 2018/0047294 A1* | 2/2018 | Esposito .............. G08G 5/0008 |

FOREIGN PATENT DOCUMENTS

| | | |
|---|---|---|
| EP | 2296128 A1 | 3/2011 |
| EP | 2833561 A1 | 2/2015 |
| EP | 2887337 A1 | 6/2015 |
| KR | 101240629 B1 | 3/2013 |
| WO | 2015131384 A1 | 9/2015 |

OTHER PUBLICATIONS

Response to Extended European Search Report dated Jan. 19, 2018, from counterpart European Patent Application No. 17181563.2, filed on Aug. 4, 2018, 13 pp.

Examination Report from counterpart European Application No. 17181563.2, dated Jan. 2, 2019, 4 pp.

Response to Examination Report dated Jan. 2, 2019, from counterpart European Application No. 17181563.2, filed Apr. 16, 2019, 20 pp.

* cited by examiner

AIR TRAFFIC AND WEATHER DATA AGGREGATING AND DE-CONFLICTING

This disclosure relates to aircraft systems.

BACKGROUND

An aircraft may use an onboard weather radar system to detect adverse weather conditions, which may enable the flight crew to make changes to the flight plan as necessary to avoid potentially hazardous weather. The onboard weather radar system may be mounted on the aircraft and may use radar scans to detect reflected radar signals from weather formations such as convective weather cells associated with turbulence, rain, lightning, and hail. Up-to-date weather information may assist the flight crew of the aircraft in evaluating whether or how to modify a flight plan to avoid certain weather cells, as well as to promote fuel efficiency, time efficiency, and passenger comfort. The onboard weather radar system may control weather radar scanning and may process radar return signals to present a visual weather radar display.

An aircraft in flight may also receive weather data from other sources such as ground-based weather radar stations, which may help identify convective weather regions or other emerging hazards for aircraft operations. Air traffic control systems may track positions and velocity of aircraft and help control aircraft positions within the vicinity of airports. Air traffic control may be based on radar surveillance, and may also be supplemented with cooperative radio surveillance techniques, such as techniques using automatic dependent surveillance—broadcast (ADS-B) systems.

SUMMARY

This disclosure describes example systems, devices, and methods for aggregating and de-conflicting composite air traffic radio surveillance data from multiple aircraft in flight and data from other data sources, such as non-aircraft data sources (e.g., air traffic control, ground weather stations). In some cases, at least some portion of an aircraft's flight may take place in relatively remote areas and outside of radio surveillance or radar airspace. Systems, devices, and methods of this disclosure may relay radio surveillance signals from one aircraft to another and from the relaying aircraft to a data aggregating system. Systems, devices, and methods of this disclosure may thus enable aggregating data from aircraft that are not in range of any radio surveillance receiving equipment other than other aircraft. Some relaying aircraft that are in range of datalink resources may relay data from other aircraft that are out of range of any other datalink resources other than the relaying aircraft.

The data from the other, non-aircraft data sources may include weather data, air traffic data, or both weather and air traffic data. In some examples, implementations of the disclosure may also include aggregating and de-conflicting weather data collected by the various aircraft in flight. Thus, in some examples, implementations of the disclosure may generate an output comprising aggregated and de-conflicted data from air traffic radio surveillance data and potentially also weather data from multiple aircraft in flight, including aircraft that may not be in range of any datalink transceivers other than those onboard other aircraft in flight, and from non-aircraft data sources.

In some examples, an air traffic and weather data aggregating system may generate an aggregated air traffic and weather data set based on relayed air traffic surveillance data and weather data from multiple aircraft and from multiple additional downlinked weather data sources. The air traffic and weather data aggregating system may perform de-conflicting analysis on overlapping air traffic data and weather data from multiple sources that are in conflict with each other. The air traffic and weather data aggregating system may provide the aggregated and de-conflicted air traffic and weather data to subscribers and other recipients. In some examples, the aggregated and de-conflicted air traffic and weather data may provide increased levels of situational awareness and collision avoidance capability compared to conventional air traffic surveillance systems and weather tracking systems that do not aggregate air traffic and weather data from multiple sources, and may help facilitate denser and more efficient air traffic and allotment of flight tracks in remote airspace, for example, among other advantages.

One example is directed to a system comprising a communication interface and one or more processors. The one or more processors are configured to receive, via the communication interface, composite air traffic radio surveillance data from one or more relaying aircraft, wherein the composite air traffic radio surveillance data comprises air traffic radio surveillance data from the one or more relaying aircraft and air traffic radio surveillance data relayed by the one or more relaying aircraft from one or more additional aircraft. The one or more processors are further configured to receive, via the communication interface, data from one or more non-aircraft data sources. The one or more processors are further configured to aggregate and de-conflict the composite air traffic radio surveillance data and the data from the one or more non-aircraft data sources, thereby generating an aggregated and de-conflicted data set. The one or more processors are further configured to generate an output based at least in part on the aggregated and de-conflicted data set.

Another example is directed to a method comprising receiving composite air traffic radio surveillance data from one or more relaying aircraft, wherein the composite air traffic radio surveillance data comprises air traffic radio surveillance data from one or more relaying aircraft and air traffic radio surveillance data relayed by the one or more relaying aircraft from one or more additional aircraft. The method further comprises receiving data from one or more non-aircraft data sources. The method further comprises aggregating and de-conflicting the composite air traffic radio surveillance data and the data from the one or more non-aircraft data sources, thereby generating an aggregated and de-conflicted data set. The method further comprises generating an output based at least in part on the aggregated and de-conflicted data set.

Another example is directed to a system including means for receiving composite air traffic radio surveillance data from one or more relaying aircraft, wherein the composite air traffic radio surveillance data comprises air traffic radio surveillance data from one or more relaying aircraft and air traffic radio surveillance data relayed by the one or more relaying aircraft from one or more additional aircraft. The system further includes means for receiving data from one or more non-aircraft data sources. The system further includes means for aggregating and de-conflicting the composite air traffic radio surveillance data and the data from the one or more non-aircraft data sources, thereby generating an aggregated and de-conflicted data set. The system further includes means for generating an output based at least in part on the aggregated and de-conflicted data set.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Air traffic data and weather data de-conflicting techniques, systems, devices, and methods of this disclosure may enable aggregating, verifying, de-conflicting, and distributing sets of air traffic and weather data from different sources. In some examples, air traffic data and weather data de-conflicting techniques, systems, devices, and methods of this disclosure may enable effective tracking of aircraft in remote airspaces in the absence of ground-based ADS-B receivers, among other advantages. Various examples of air traffic data and weather data aggregating and de-conflicting techniques, systems, devices, and methods are further described below.

Figure 1:
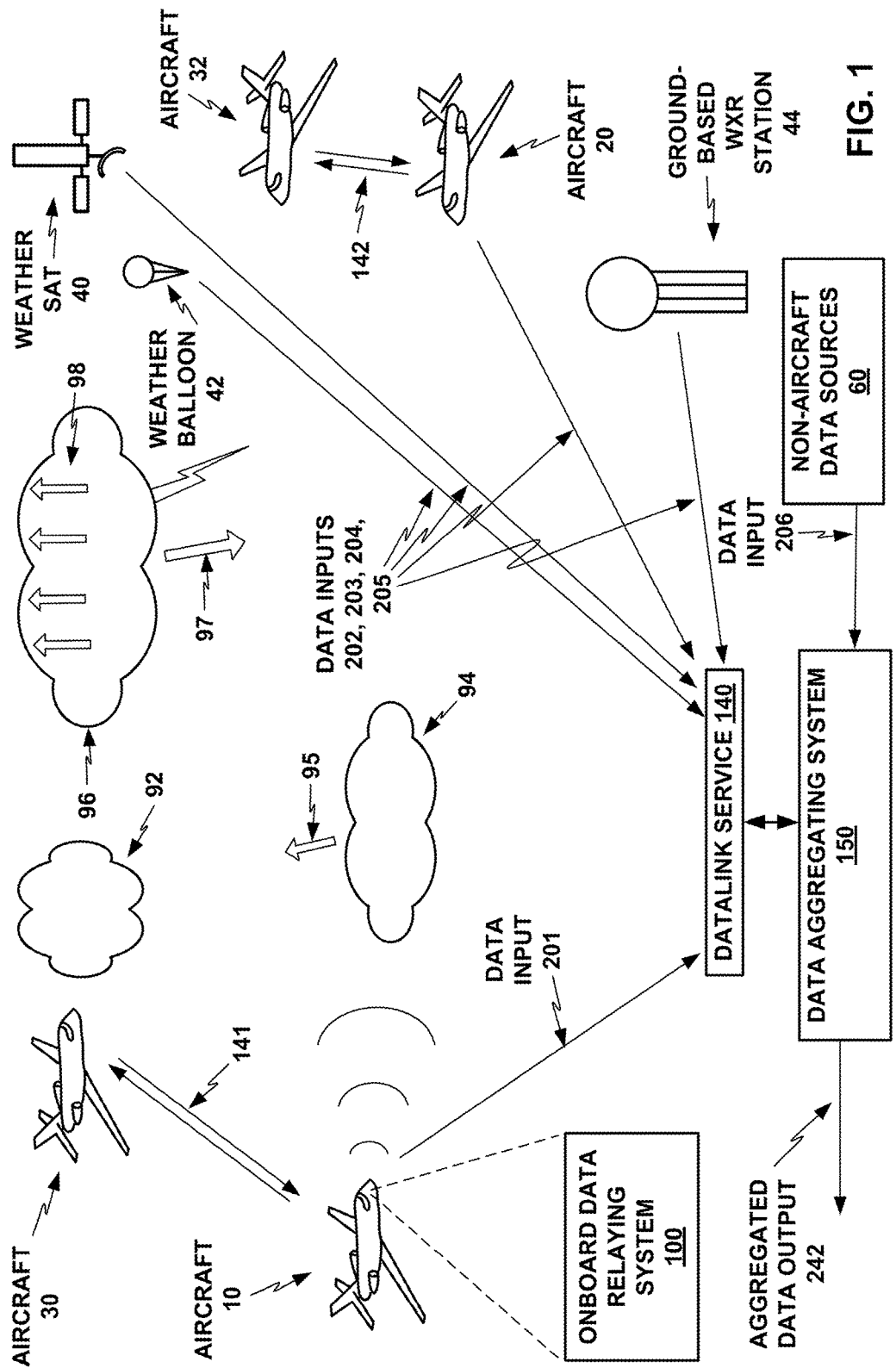
FIG. 1 depicts a conceptual diagram of an example data aggregating system configured to aggregate and de-conflict air traffic data from potentially large numbers of aircraft and additional data from various non-aircraft data sources.

FIG. 1 depicts a conceptual diagram of an example data aggregating system 150 configured to aggregate and de-conflict air traffic data from potentially large numbers of aircraft including representative aircraft 10, 20, 30, 32 ("aircraft 10-32"), and additional data from various non-aircraft data sources including representative non-aircraft data sources 40, 42, 44, 60 ("non-aircraft data sources 40-60"), in accordance with one example of this disclosure. In various examples, data aggregating system 150 may collect, aggregate, and de-conflict data from any suitable number of aircraft, and from any suitable number of non-aircraft data sources. Thus, although four aircraft and four non-aircraft data sources 40-60 are shown in FIG. 1, in other examples, system 150 may be used with any suitable number of aircraft (e.g., more than two aircraft) and any suitable number of non-aircraft data sources (e.g., one or more non-aircraft data sources). Further, any of the features of data aggregating system 150 as described herein may be used in any suitable combination.

The air traffic data from aircraft 10-32 includes both directly transmitted air traffic data from aircraft 10 and 20 downlinking their own air traffic data to data aggregating system 150, along with relayed air traffic data originating from aircraft 30 and 32, transmitted from aircraft 30 to aircraft 10 and relayed by aircraft 10 to data aggregating system 150, and transmitted from aircraft 32 to aircraft 20 and relayed by aircraft 20 to data aggregating system 150.

In some examples, in addition to or instead of air traffic data, data aggregating system 150 may also receive weather data downlinked from aircraft 10-32. Data aggregating system 150 receives data, such as weather data and additional air traffic data, from non-aircraft data sources 40, 42, 44, 60, illustratively including a weather satellite 40, a weather balloon 42, a ground-based weather radar station 44, and additional non-aircraft data sources 60, in the example of FIG. 1.

In the example shown in FIG. 1, aircraft 10-32 each includes a system for collecting air traffic data from other aircraft and for reporting the air traffic data from the respective aircraft (e.g., ownship data) via a radio surveillance system, such as an onboard automatic dependent surveillance—broadcast (ADS-B) system. Aircraft 10-32 may also include onboard weather radar systems and other weather data collecting systems that perform and process weather radar scans and collect other weather data. Aircraft 10-32 each includes a datalink system that communicates with data aggregating system 150 via datalink service 140. The communication from each aircraft 10-32 to datalink system 150 may be regular in some examples (e.g., at a predetermined frequency of time), or may be less regular in other examples (e.g., only upon request by system 150, by request from a flight crew or ground crew, or the like).

In the example shown in FIG. 1, aircraft 30 and 32 may be representative of aircraft in remote areas outside of range of datalink service 140, such as in airspace over the oceans relatively far from land, and/or in polar regions or major deserts, but within range of aircraft 10 and 20, respectively, via cooperative radio surveillance channels 141 and 142, respectively. Aircraft 10 and 20 each receives ADS-B messages from surrounding aircraft within their respective cooperative radio surveillance ranges, including ADS-B transmissions 141 from aircraft 30 to aircraft 10 and ADS-B transmissions 142 from aircraft 32 to aircraft 20, as examples of what could include many more aircraft within surveillance range of aircraft 10 or 20. Cooperative radio surveillance channels 141 and 142 may be via automatic dependent surveillance—broadcast (ADS-B) transmissions in some examples. Each aircraft may receive ADS-B messages from other aircraft with an onboard Traffic Collision Avoidance System (TCAS) unit, for example, or any other system capable of receiving ADS-B signals.

In some examples, an aircraft configured to participate in collecting and sending data to data aggregating system 150 may also be configured to downlink some or all ADS-B messages it receives from other aircraft, independently of proximity standards for reporting proximate air traffic such as those that may be defined by the Radio Technical Commission for Aeronautics (RTCA) or the Federal Aviation Administration (FAA) in the U.S. For example, aircraft 30 may be in remote airspace over an ocean or over a polar area, and may be out of range of datalink service 140, but within ADS-B range of aircraft 10, while aircraft 10 may be within range of datalink service 140.

Aircraft 10 includes an onboard data relaying system 100, which may be implemented in an onboard ADS-B system or other radio surveillance system configured to relay ADS-B data and weather data from other aircraft such as aircraft 30 to data aggregating system 150. Aircraft 10 is configured to communicate with data aggregating system 150 by datalink communication via datalink service 140, which may include various space-based, airborne, and/or ground-based transceivers, communication relays, or other assets, as further described below with reference to FIG. 2. Aircraft 10 may thereby relay air traffic data and weather data that aircraft 10 receives from aircraft 30 to data aggregating system 150 via datalink service 140, together with air traffic data and weather data originating from aircraft 10. Similarly, aircraft 20 may downlink its own air traffic data and weather data that aircraft 20 collects to data aggregating system 150, and aircraft 20 may also relay air traffic data and weather data that aircraft 20 receives from aircraft 32 to data aggregating system 150. The data transmissions downlinked from aircraft 10 and 20 to data aggregating system 150 may be considered to be composite data in that they include air traffic data and weather data collected by the own aircraft 10 or 20 and the relayed air traffic data and weather data collected and transmitted from the remotely located aircraft 30 or 32, composited together.

In some examples, the air traffic data collected and transmitted by each of aircraft 10-32 to data aggregating system 150 may include one or more data on the position, latitude, longitude, flight identifier (ID), range, bearing, ground track, ground speed, air speed, altitude, any National Airspace System (NAS) operational data, operational data of a track system airspace such as the North Atlantic Track System (NATS), or any other flight parameters of the transmitting aircraft and of each of the other aircraft that transmits to a respective transmitting aircraft. Accordingly, in some examples, the composite air traffic surveillance data that data aggregating system 150 is configured to receive from one or more aircraft 10-32 may include at least one of a latitude, a longitude, a flight identifier (ID), a range, a bearing, a ground track, a ground speed, and an altitude, for at least one of the relaying aircraft 10, 20 and at least one of the additional aircraft 30, 32.

In some examples, the weather data collected and transmitted by each of aircraft 10-32 to data aggregating system 150 may include one or more of weather radar data from each aircraft's onboard weather radar system, air data system, inertial navigation system, and other systems and sensors that collect data relevant to weather. In various examples, an aircraft's air data system may provide static air temperature/total air temperature (SAT/TAT), wind speed and directions, lightning sensor detections, and processing and interpretation of various weather information. In various examples, an aircraft's inertial navigation system may sense body acceleration and angular rate of motion of the aircraft and thus indicate the presence and severity of turbulence. An aircraft's weather-relevant sensors may also include an icing detection system configured to indicate icing conditions, and a ground proximity warning system (GPWS) that may sense wind shear, for example. The various aircraft 10-32 may transmit, relay, and/or downlink any of these or other examples of air traffic data and weather data to data aggregating system 150.

In some cases, e.g., depending on the proximity of aircraft 10-32, at least some of the aircraft 10-32 may collect ADS-B air traffic surveillance data and weather data that is partially overlapping with each other's coverage, as well as air traffic surveillance data and weather data that is partially unique to a single aircraft. Aircraft 10 and aircraft 20 may then provide partially overlapping and partially unique ADS-B air traffic surveillance data and weather data to data aggregating system 150. This may be more generally applicable with larger numbers of participating aircraft that communicate air traffic surveillance data to data aggregating system 150, such that some portions of the air traffic surveillance data and weather data that data aggregating system 150 receives may be unique data sourced from only a single participating reporting aircraft, while other portions of the air traffic surveillance data and weather data that data aggregating system 150 receives may be overlapping data from two or more participating reporting aircraft.

The various data gathering assets, such as representative aircraft 10-32 and non-aircraft data sources 40-60 as shown in FIG. 1 (collectively, "weather data gathering assets 10-60," representative of any number and variety of air traffic data and other data gathering assets), may transmit data they respectively collect, such as representative data inputs 201, 202, 203, 204, 205, 206 from aircraft 10, weather balloon 42, weather satellite 40, aircraft 20, ground-based weather radar station 44, and other non-aircraft data sources 60, respectively, to data aggregating system 150 via datalink service 140 and/or other communication means. Data gathering assets 10-60 as shown in FIG. 1 are representative examples of air traffic data and/or weather data collecting systems, which may also include any number of aircraft, other air-based weather radar and/or weather sensing platforms, ground-based weather radar and/or weather sensing systems, sea-based weather radar and/or weather sensing platforms, satellites or other space-based weather radar and/or weather sensing platforms, and various other vehicles, platforms, or assets equipped with weather radar and/or weather sensing systems.

Data aggregating system 150 may thus receive air traffic data and weather data from multiple aircraft 10-32 and from any number of similarly disposed aircraft that may be either in range of at least one datalink asset of datalink service 140 and/or in range of another aircraft via a cooperative radio surveillance channel between the respective aircraft. Data aggregating system 150 may also receive data from additional, non-aircraft data sources 40-60 that may downlink or communicate data to data aggregating system 150 via datalink service 140 or via direct communicative connection or other means. For example, data aggregating system 150 may receive ground-based radio surveillance or radar coverage from ground-based systems such as ground-based weather radar station 44. For example, an air traffic authority or service provider such as the FAA may operate a Traffic Information Service—Broadcast (TIS-B) system that provides secondary surveillance radar (SSR) data in an ADS-B-like format, and data aggregating system 150 may receive the TIS-B data (e.g., ADS-B-like data containing SSR data) from the TIS-B provider and aggregate the TIS-B data with the other air traffic data and weather data that data aggregating system 150 receives from various aircraft and other data sources.

Data aggregating system 150 is configured to aggregate the air traffic data and weather data it receives from multiple sources among the various aircraft 10-32 and the various additional non-aircraft data sources 40-60. Data aggregating system 150 is configured to compare and de-conflict the air traffic data and the weather data from the various aircraft and other data sources for the same or otherwise overlapping times and volumes of space. For example, in cases where data aggregating system 150 determines that the different air traffic and weather data sets are conflicted for the same or otherwise overlapping times and volumes of space (e.g., different sets of data covering the same time and space give different and conflicting positions or headings for the same aircraft, or different and conflicting positions, sizes, altitudes, vertical growth trends, or radar reflectivity for a convective weather feature), data aggregating system 150 may perform a de-conflicting analysis and generate a de-conflicting correction to incorporate in its aggregated data. As another example, in cases where data aggregating system 150 determines that the different air traffic and weather data sets are not conflicted for the same or otherwise overlapping times and volumes of space, data aggregating system 150 may perform de-conflicting by verifying that the data from various data sources in its aggregated data set covering the same time and space are not conflicted but instead are mutually consistent.

Data aggregating system 150 is configured to generate aggregated data outputs 242 that constitute aggregated and de-conflicted sets of data from multiple sources. Data aggregating system 150 may generate aggregated data outputs 242 based on data from potentially large numbers both of aircraft, whether in or out of range of datalink service 140, and additional, non-aircraft data sources. Data aggregating system 150 may provide its aggregated data outputs 242 to recipients such as aircraft, aircraft operators, and subscribers to an aggregated air traffic and weather data service provided via datalink service 140, the Internet, or other communication means.

Datalink service 140 may include and/or make use of one or more ground-based datalink assets, one or more telecommunication satellites, and potentially additional assets, as further described below with reference to FIG. 2. Data aggregating system 150 may use datalink service 140 to gather data from various weather data collecting assets, including and potentially beyond aircraft 10-32 and at least some of non-aircraft data sources 40-60 as shown in FIG. 1. For example, data aggregating system 150 may also collect, receive, and aggregate data from weather data collecting drones or unmanned aerial vehicles (UAVs) (not shown in FIG. 1), marine-based weather radar systems installed or carried on marine vessels, oil platforms, or other marine vehicles or marine assets (not shown in FIG. 1), and/or any of a wide variety of other assets that may collect any type of data relevant to weather. Weather satellite 40 may scan weather formations in microwave, infrared, or other wavelength from Earth orbit, for example. Ground-based weather radar system 44 may be part of a network of ground-based weather radar systems such as the Next Generation Weather Radar System (NEXRAD) radar network operated by the National Weather Service in the United States, for example.

In some examples, data aggregating system 150 may aggregate air traffic data and potentially also weather data from a large number and variety of different weather data sources, including potentially intermediate weather data service providers that may themselves aggregate weather data from various sources. For example, data aggregating system 150 may aggregate weather data directly from the sources and/or from intermediate weather data aggregating services that may provide weather data from NEXRAD, satellite cloud height data, wind aloft data, temperatures aloft data, echo top and storm movement data, AIRMET data, SIGMET data, lightning data, CONUS radar coverage mask data, Clear Air Turbulence (CAT) data, and Storm Cell Info Tracking (SCIT) data, for example. In some examples, data aggregating system 150 may only aggregate and de-conflict air traffic data and not weather data. Data aggregating system 150 may be ground-based, e.g., at a centralized information service provider, or at an airline company operations center, in some examples.

Aircraft 10 (via its onboard weather radar system) and the other data gathering assets 20-60 may each, via weather radar and/or other weather data collecting means, characterize the weather (e.g., provide radar reflectivity, color-coded by hazard level, of each position in a volume of space covered by a radar scan; provide an air temperature at the aircraft's position; or the like or any combination thereof) of at least partially overlapping portions of a volume of space of the sky during an at least partially overlapping time interval, as conceptually depicted in FIG. 1. For example, aircraft 20, weather balloon 42, and ground-based weather radar station 44 may be operating proximate to (e.g., within tens or hundreds of miles of) aircraft 10, and weather satellite 40 may be operating from a position in Earth orbit above the airspace of aircraft 10. In the example shown in FIG. 1, the weather in the volume of space and during the interval of time depicted in FIG. 1 includes convective weather cells 92, 94, and 96 ("convective weather cells 92-96"). Aircraft 10 is equipped with an onboard weather radar system, and may operate its onboard weather radar system to collect radar data characterizing the weather proximate to and along the heading of aircraft 10.

Some or all of data gathering assets 10-60 may all gather at least some data on convective weather cells 92-96 and transmit the data on convective weather cells 92-96 to data aggregating system 150. In the example shown in FIG. 1, convective weather cells 94 and 96 have lateral motions 95 and 97 (represented in FIG. 1 with arrows 95 and 97) respectively, and weather cell 96 has a vertical growth trend 98 (represented in FIG. 1 with arrows 98). Aircraft 10-32 and at least some of the other weather data gathering assets 40-60 may each characterize at least some of convective weather cells 92-96 along with their lateral motions and vertical trends, and include the characterizations of the lateral motions and vertical trends of convective weather cells 92-96 in the weather data they communicate to data aggregating system 150.

Aircraft 32 may be substantially closer to convective weather cell 96 than any other aircraft or other weather data gathering asset during the time interval shown in FIG. 1, and may be in position such that its onboard weather radar system is able to characterize convective weather cell 96 with higher resolution than any other weather data gathering asset during the depicted interval of time. Convective weather cell 96 may also be at least partly obscured from the perspective of at least some of the other aircraft 10, 20, and 30, and other data gathering assets 40-60 by other weather features such as convective weather cells 92 and 94, which may be highly radar-reflective, such as due to high levels of internal precipitation. Convective weather cells 92 and 94 may thus strongly reflect active weather radar scanning signals from of at least some of other aircraft 10, 20, 30, and other data gathering assets 40-60, and may saturate the gain of weather radar receivers of weather radar systems of at least some of weather data gathering other aircraft 10, 20, and other data gathering assets 40-60, in this example. Intervening weather features such as convective weather cells 92 and 94 may thus degrade or obscure weather radar signals or other weather data signals of the region that includes convective weather cell 96 from at least some of other aircraft 10, 20, 30, and other data gathering assets 40-60 in this example.

Aircraft 30 may have an onboard graphical weather radar display system (not shown in FIG. 1; shown in subsequent figures and further described below with reference thereto) that displays weather information generated based on the radar signals of the onboard weather radar system, and that displays graphical representations of convective weather cells 92-96, as further described below with reference to FIG. 4. The onboard weather radar system of aircraft 30 may make measurements of the motions of convective weather cells 92-96 over time, and output an indication of the motions of the convective weather cells 92-96 in the onboard graphical weather radar display. For example, the onboard weather radar system may detect the horizontal motions of convective weather cells 92-96 over time, such as in terms of radial horizontal motions (toward and away from aircraft 30) and tangential horizontal motions (side-to-side from the perspective of aircraft 30), which the onboard weather radar system may also detect in terms of or translate into north-south and east-west components of horizontal motion. The onboard weather radar system may also detect reflectivity trends in convective weather cells 92-96 over time, which may be indicative of whether convective weather cells 92-96 are dissipating or growing larger and stronger, as further described below with reference to FIG. 4.

Data aggregating system 150 is configured to transmit aggregated air traffic and weather data outputs 242 to recipients including aircraft 30. For example, aircraft 30 may be in receiving range but not transmitting range of a datalink satellite or other datalink asset of datalink service 140, and aircraft 30 may receive aggregated data outputs 242 from data aggregating system 150 via datalink service 140. In other examples, a communication system (e.g., an ADS-B system or a datalink system) of aircraft 10 may relay data both for downlink and uplink between data aggregating system 150 and aircraft 30, so that aircraft 10 may receive aggregated data outputs 242 from data aggregating system 150 and relay the aggregated data outputs 242 to aircraft 30.

Data aggregating system 150 may be configured such that it performs de-conflicting of different sets of air traffic data and weather data, which may include determining a difference between the first set of weather data and the second set of weather data in one or more of a horizontal motion of one or more weather features, a vertical trend of one or more weather features, and a reflectivity trend of one or more weather features. At least one of the first set of weather data or the second set of weather data may comprise data indicative of one or more of a lateral motion of a weather feature, a tangential motion of one or more weather features in the identified region, a radial motion of the one or more weather features in the identified region, a vertical trend of a weather feature, a reflectivity trend of a weather feature, lightning, ice, hail, wind shear, and clear air turbulence (CAT).

Aircraft 30 may also receive aggregated air traffic and weather data from data aggregating system 150, and update its air traffic and weather data displays for its flight crew based on the aggregated data outputs it receives from data aggregating system 150, as further described below with reference to FIG. 5. Data aggregating system 150 may thus provide its recipients with updated weather data with improved accuracy based on aggregated, de-conflicted, and corrected air traffic data and weather data outputs, which may be more extensive and more accurate than data from any individual source.

Data aggregating system 150 is thus configured to receive composite air traffic radio surveillance data from one or more relaying aircraft 10 and/or 20, wherein the composite air traffic radio surveillance data comprises air traffic radio surveillance data from the one or more relaying aircraft 10 and/or 20 and air traffic radio surveillance data relayed by the one or more relaying aircraft 10 and/or 20 from one or more additional aircraft 30 and/or 32. Data aggregating system 150 is further configured to receive data from one or more non-aircraft data sources 40-60; aggregate and de-conflict the composite air traffic radio surveillance data from one or more of aircraft 10-32 and the data from the one or more non-aircraft data sources 40-60, thereby generating an aggregated and de-conflicted data set; and generate an aggregated data output 242 based at least in part on the aggregated and de-conflicted data set.

In some examples, data aggregating system 150 may communicate the aggregated data outputs with low latency or delay (e.g., within a selected interval of milliseconds, seconds, or minutes) so that recipients receive the aggregated data outputs while the data is still up-to-date, and, in some examples, also still relevant to the current position of the aircraft. Aircraft onboard system recipients of the aggregated data outputs may generate a display of or based on the aggregated data outputs (e.g., multiple aggregated data outputs refreshed frequently) on a cockpit display, such as may be implemented as a part of an air traffic data display system, or in any other form that may be useful to a pilot or flight crew operating a recipient aircraft, or useful to any other system aboard the recipient aircraft.

For example, data aggregating system 150 may transmit or communicate its aggregated data outputs to one or more recipients within a nominal latency of receiving the air traffic surveillance data and weather data from the various participating aircraft and other data sources. In some examples, the nominal latency of providing the aggregated data outputs may be characterized in accordance with aviation data latency standards for externally sourced data provided to recipient aircraft or other recipients. For example, data latency standards in the aviation industry may specify overall data latency driven by requirements of systems or applications that use the data. Industry standards may establish common time reference so consumers of air traffic surveillance data are able to determine the age of the data.

In some examples, the nominal latency may also be characterized by expectations of data delay or data freshness by pilots operating the recipient aircraft, at least in comparison with traditional ground-based air traffic control systems. For example, the nominal latency may be characterized by pilots and air traffic authorities considering it close enough to real-time to enable pilots to use it for effectively and safely operating the recipient aircraft, in accordance with industry and regulatory standards. Although nominal latency may be defined using any suitable standard, in some examples, the nominal latency may involve a typical total round-trip latency, between the one or more reporting aircraft transmitting their ADS-B air traffic surveillance data to data aggregating system 150, and receiving the aggregated data outputs in a form rendered on their cockpit displays. In various examples, a nominal data latency delay may be various ranges between a fraction of a second and a number of minutes. Data aggregating system 150 may thus be configured in some examples to generate aggregated and de-conflicted outputs 242 within a nominal latency of receiving the composite air traffic radio surveillance data from the one or more relaying aircraft 10, 20.

Figure 2:
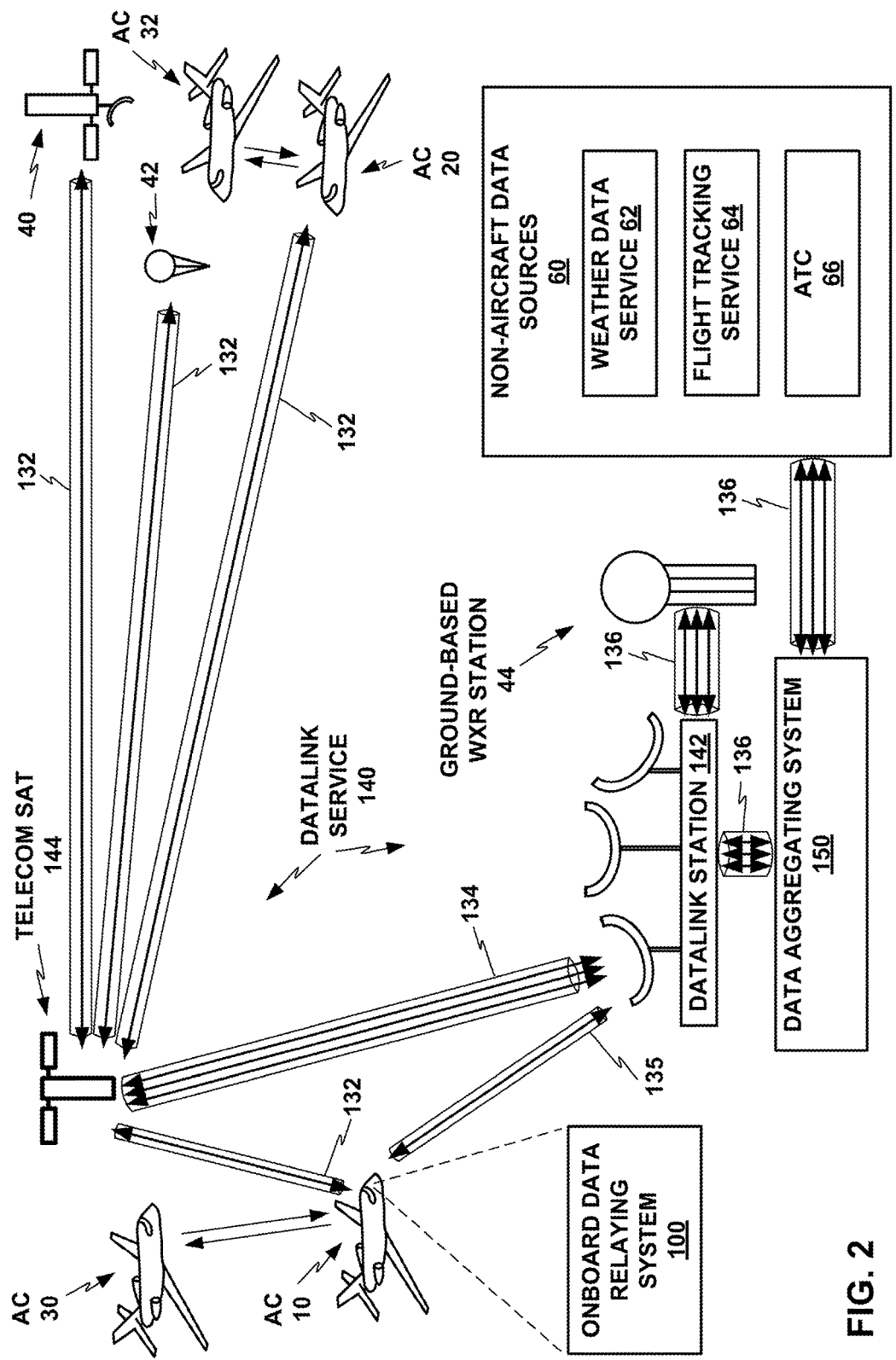
FIG. 2 depicts a conceptual diagram of an aircraft equipped with an example onboard data relaying system in communicative connection via a datalink service with a data aggregating system.

FIG. 2 depicts a conceptual diagram of an aircraft 10 equipped with an example onboard data relaying system 100 in communicative connection via datalink service 140 with data aggregating system 150. Data aggregating system 150 is configured to receive air traffic data and weather data from multiple aircraft and other data sources via datalink service 140 and other communication systems, aggregate and de-conflict the air traffic data and weather data, and output aggregated data outputs composed of aggregated and de-conflicted collections of the air traffic data and weather data. FIG. 2 provides additional detail, including of datalink service 140, of some examples corresponding to FIG. 1.

In the example of FIG. 2, datalink service 140 includes one or more datalink stations such as representative datalink station 142 and one or more telecommunications satellites such as representative telecommunications satellite 144. FIG. 2 also shows aircraft 10-32, weather satellite 40, weather balloon 42, and ground-based weather radar station 44, and other non-aircraft data sources 60 as in FIG. 1. Telecommunications satellite 144 is configured to maintain radio broadband datalink connections 132 with aircraft 10 and 20, weather satellite 40, and weather balloon 42. Telecommunications satellite 144 and datalink station 142 are configured to maintain a radio broadband datalink connection 134 with each other.

Datalink station 142 is also configured to maintain hard-line broadband network connections 136 with ground-based weather radar station 44 and with data aggregating system 150. Datalink station 142 may also communicate directly with aircraft 10 using point-to-point data communication channel 135, such as an implementation of Flight Information Services-Broadcast (FIS-B). Assets such as datalink station 142 and telecommunications satellite 144 may thus implement datalink service 140 to maintain broadband datalink connections among aircraft 10 and 20, data aggregating system 150, and other data collecting assets and aggregated data recipients. Aircraft 30 and 32 may be out of range of telecommunications satellite 144 in the interval of time in the example shown in FIGS. 1 and 2.

In some examples, telecommunications satellite 144 may be equipped with broadband capability, such as Ka band datalink transmission and reception capability, in some examples. In one example, telecommunications satellite 144 may be a Global Xpress (GX) satellite operated by Inmarsat PLC of London, United Kingdom. Telecommunications satellite 144 may be in geosynchronous Earth orbit (GEO) and may provide coverage over a large area of the Earth in some examples, and may interoperate with additional comparable telecommunications satellites that may provide complementary coverage over other large sections of the Earth, in some examples. Datalink service 140 may also be configured to include or operate with other types of remote coverage broadband datalink systems, such as broadband datalink connections implemented by drones or automated airships, for example.

In some examples, data aggregating system 150 may also have a communicative connection via hard-line broadband network connections 136 with certain other non-aircraft data sources 60, which may include a weather data service 62, a flight tracking service 64, and an air traffic control (ATC) authority 66, in this example, as further described below with reference to FIG. 3. Data aggregating system 150 may receive air traffic data and/or weather data from any of these other non-aircraft data sources 60 via hard-line broadband network connections 136 or another suitable communication link, and aggregate and de-conflict the air traffic data and/or weather data from any of these other non-aircraft data sources 60 with the air traffic data and potentially also weather data that data aggregating system 150 receives from at least some of aircraft 10-32, weather satellite 40, weather balloon 42, and ground-based weather radar station 44.

Aircraft 10-32 and other data gathering assets 40-60 are thus enabled to communicate air traffic data, weather data, and other data to data aggregating system 150, including by relay through aircraft 10 and 20 for aircraft 30 and 32. Data aggregating system 150 is thus enabled to receive directly transmitted air traffic and weather data and relayed air traffic and weather data from various aircraft, and to receive data such as air traffic and weather data from various non-aircraft sources, to aggregate and de-conflict the data from the aircraft and other sources, and to communicate the aggregated and de-conflicted data to recipients. In other examples, onboard data relaying system 100 and data aggregating system 150 may use any other implementation of data connection to communicate data with each other.

Figure 3:
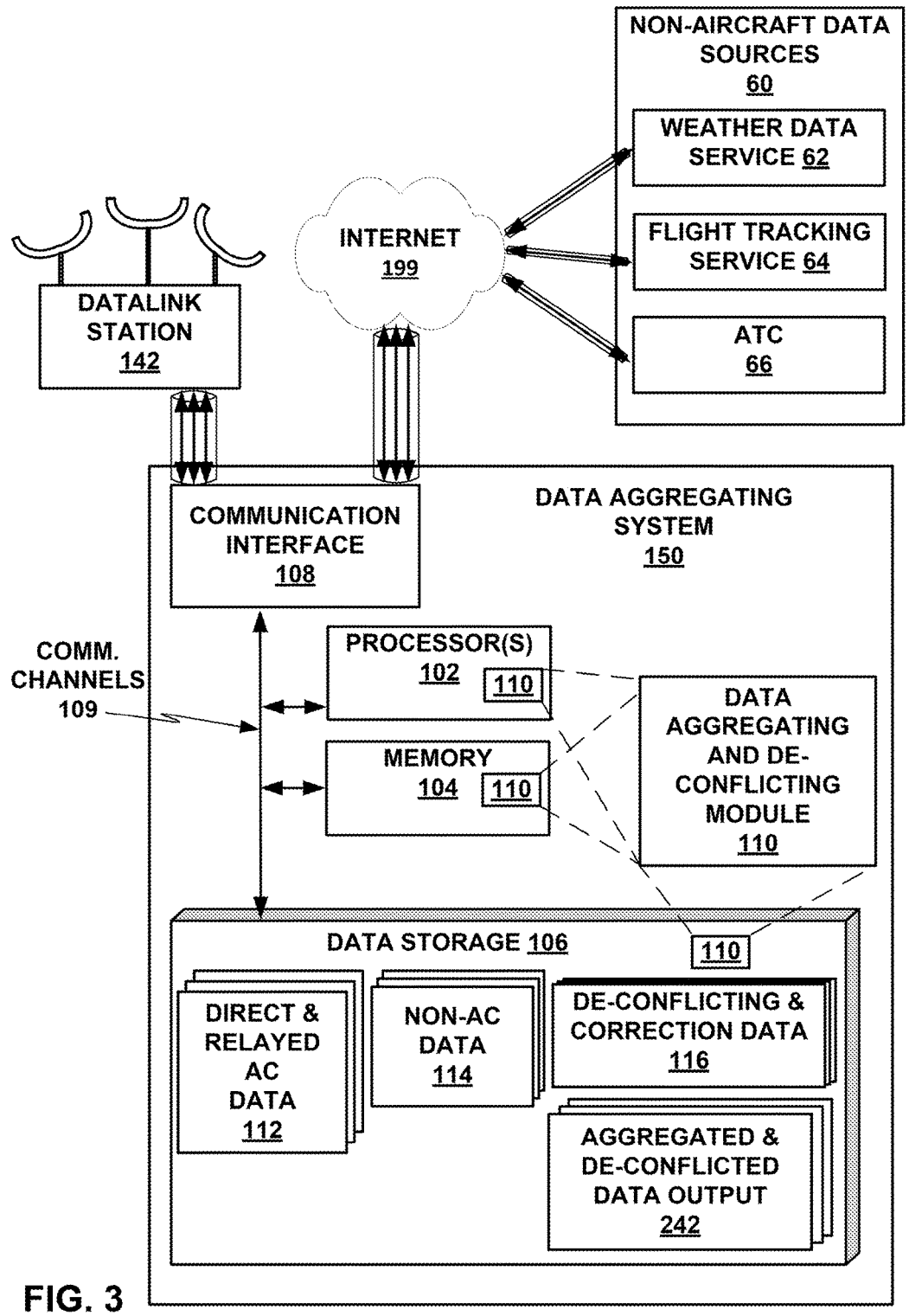
FIG. 3 depicts a conceptual block diagram of an example data aggregating system communicatively coupled to an example datalink station, which may include radio transmission and reception equipment configured to maintain broadband datalink communications with various aircraft and other data sources directly and/or via other elements of a datalink service.

FIG. 3 depicts a conceptual block diagram of an example data aggregating system 150 communicatively coupled to datalink station 142. In some examples, as discussed above, datalink station 142 includes radio transmission and reception equipment (e.g., a Ka band radio interface) configured to maintain broadband datalink communications with various aircraft and other data sources directly and/or via other elements of datalink service 140 as shown in FIGS. 1 and 2, in accordance with one example of this disclosure. Data aggregating system 150 as shown in FIG. 3 may be a more detailed view of some examples of data aggregating system 150 as shown in FIGS. 1 and 2.

As shown in FIG. 3, data aggregating system 150 includes one or more processors 102 ("processors 102"), one or more memory components 104 ("memory 104"), one or more data storage devices 106 ("data storage 106"), and a communication interface (CI) 108 (e.g., including a network interface or bus interface), which is connected to one or more of the other components depicted in FIG. 3 via communication channels 109 (e.g., a or communications bus) and communicatively coupled via datalink station 142 to other elements of datalink service 140. Data aggregating system 150 is thus configured to communicate with various aircraft and other data sources as shown in FIGS. 1 and 2 via datalink service 140.

In data aggregating system 150, the processors 102, memory 104, data storage 106, and communication interface 108 are interconnected by communication channels 109, such as a bus or communication fabric, for transporting or communicating data and instruction code between processors 102, memory 104, data storage 106, and communication interface 108. Processors 102 may include one or more central processing units (CPUs), one or more CPU cores, one or more graphical processing units (GPUs), one or more digital signal processors (DSPs), one or more application-specific integrated circuits (ASICs), one or more field programmable gate array (FPGAs), or any other type of processing units or other discrete or integrated logic circuitry. Functions attributed to processors 102 may be embodied as software, firmware, hardware, and combinations thereof.

Memory 104 may include any form of working memory, such as any form of random access memory (RAM), cache circuits, and/or one or more volatile or more or less short-term data storage devices. In some examples, memory 104 may host in-memory data stores. Data storage 106 may include any form of hard disc drives, redundant array of independent discs (RAID), Flash drives, cloud storage, or any other form of data storage, and may host any form of databases, schemaless data stores, or any type of data stores. Data aggregating system 150 may process incoming data and outgoing data via communication interface 108, which may include interface subsystems for managing data communication with external resources such as datalink station 142 and datalink service 140, and one or more public and/or private networks such as the Internet 99. Communication interface 108 may include circuitry and hardware for receiving and processing data from datalink station 142 and for communicating data to datalink station 142.

Data aggregating system 150 may receive data from one or more non-aircraft data sources 60 via hard-line broadband connections through the Internet 199 or another suitable communication system. For example, as shown in FIG. 3, data aggregating system 150 may receive data via Internet 199 from non-aircraft data sources 60 such as weather data service 62, flight tracking service 64, and/or air traffic control (ATC) authority 66 or other facility operated by an Air Navigation Service Provider (ANSP). Weather data service 62 may include any service for providing any general form of weather data. Flight tracking service 64 may include any service for providing data on aircraft flights, including air traffic data. Air traffic control 66 may provide any form of data available to an air traffic control authority that may be available. Data aggregating system 150 may receive any of various forms of air traffic data, weather data, and/or other data from non-aircraft data sources 60.

Data aggregating system 150 thus receives data from various aircraft and non-aircraft data sources. The data from the various aircraft and non-aircraft data sources may at least partially cover the same or otherwise overlapping volumes of space and the same or otherwise overlapping times. Data aggregating system 150 may at least temporarily store aircraft data sets 112 that include both directly transmitted and relayed aircraft data 112 that data aggregating system 150 receives from aircraft 10 and 20, respectively, and that originate from the same aircraft 10 and 20, in addition to one or more other aircraft 30 and 32. Aircraft data sets 112 thus include data originally collected by aircraft 10 and 20 and directly downlinked from aircraft 10 and 20, as well as data originally collected by aircraft 30 and 32, transmitted by aircraft 30 and 32 to aircraft 10 and 20, e.g., via ADS-B or other cooperative surveillance transmissions, and relayed from aircraft 30 and 32 by aircraft 10 and 20 to data aggregating system 150. Aircraft data 112 includes air traffic data and may include other data such as weather radar data and/or other weather data from aircraft 10-32.

Data aggregating system 150 receives sets of non-aircraft data 114 from non-aircraft data sources 60. Various data from different non-aircraft data sources 60 may also at least partially cover the same or otherwise overlapping volumes of space and the same or otherwise overlapping times as each other as well as of aircraft data sets 112 from aircraft 10-32. Data aggregating system 150 may at least temporarily store non-aircraft data sets 114 in data storage 106.

Data aggregating system 150 has a data aggregating and de-conflicting module 110 installed thereon. Data aggregating and de-conflicting module 110 may include or be a software application, software library, or any other form or set of software stored in data storage 106, loaded in memory 104, and/or executed by processors 102. Data aggregating and de-conflicting module 110 may include or be any form of executable software instruction code, including a stand-alone application, one or more portions of an executable software application, a software library or collection of applications, processes, and/or microservices, a library of multiple executable software applications and associated classes, methods, processes, objects, functions, routines, or other resources, or other any other form of executable software instruction code. Data aggregating and de-conflicting module 110 may also include or be implemented as or with specialized hardware such as one or more application-specific integrated circuits (ASICs), one or more field programmable gate arrays (FPGAs), and/or one or more graphical processing units (GPUs).

Data aggregating and de-conflicting module 110 may configure processors 102 (or other processing hardware elements) to receive sets of data from multiple sources, such as aircraft data sets 112 from aircraft 10-32 and non-aircraft data sets 114 from non-aircraft data sources 40-60. Data aggregating and de-conflicting module 110 may further configure processors 102 (or other processing hardware elements) to perform comparison, verification, and/or de-conflicting of sets of air traffic data, weather radar data and/or other weather data, and/or other data from multiple sources. Data aggregating and de-conflicting module 110 may further configure processors 102 (or other processing hardware elements) to generate de-conflicting and correction data 116, including corrective air traffic data outputs and/or corrective weather data outputs, based on processes of comparing, de-conflicting, and/or correcting air traffic data and/or weather data sets from two or more air traffic data and/or weather data sources from among aircraft 10-32 (as representative of any number and variety of aircraft) and/or non-aircraft data sources 40-60 (as representative of any number and variety of non-aircraft data sources). These and other functions and capabilities for which data aggregating and de-conflicting module 110 may configure processors 102 are further described below.

Data aggregating and de-conflicting module 110 may generate aggregated and de-conflicted data outputs 242 by aggregating and de-conflicting aircraft data sets 112 and non-aircraft data sets 114, and based on generating and correcting for de-conflicting and correction data 116, as further explained below. Data aggregating and de-conflicting module 110 may at least temporarily load and/or store aggregated and de-conflicted data outputs 242 in memory 104 and/or data storage 106. Data aggregating and de-conflicting module 110 may output aggregated and de-conflicted data outputs 242 for communication via communication interface 108 and potentially via datalink station 142 and datalink service 140, Internet 199, and/or other modes of communication to recipients of the aggregated and de-conflicted data.

Data aggregating system 150 thus includes one or more processors 102 configured to receive composite air traffic radio surveillance data 112 from one or more relaying aircraft 10, 20, wherein the composite air traffic radio surveillance data 112 comprises air traffic radio surveillance data from one or more relaying aircraft 10, 20 and air traffic radio surveillance data relayed by the one or more relaying aircraft 10, 20 from one or more additional aircraft 30, 32. One or more processors 102 of data aggregating system 150 are further configured to receive data 114 from one or more non-aircraft data sources 40-60, aggregate and de-conflict the composite air traffic radio surveillance data 112 and the data 114 from the one or more non-aircraft data sources, thereby generating an aggregated and de-conflicted data set aggregated from data sets 112 and 114 and de-conflicted with de-conflicting and correction data generated by evaluating and de-conflicting the received data sets 112 and 114, and generate an aggregated data output 242 based at least in part on the aggregated and de-conflicted data set.

In some examples, one or more processors 102 of data aggregating system 150 may apply a subscriber agreement in managing and periodically confirming or modifying a list of its recipients to which to transmit the aggregated data outputs 242. For example, data aggregating system 150 may provide transmissions to different recipients in accordance with terms of service subscriptions with clients associated with the recipients, such as airlines or other operators of aircraft fleets, or web interface air traffic and/or weather data clients with different subscription plans for different levels of data. The recipients may also include entities other than operators of the aircraft, who may have different subscription terms, such as for occasional communications of aggregated air traffic and/or weather data sets in bulk data form rather than for transmitting aggregated air traffic and/or weather data sets in nominal real-time as with recipient aircraft in flight. Non-aircraft recipients may include a data mining system or an operator thereof, for example, that may analyze the aggregated air traffic and/or weather data sets for additional useful purposes. Non-aircraft recipients may include an air navigation service provider (ANSP), a jurisdictional aviation regulatory authority, an aeronautics agency, an academic research body, or other enterprise, any of which may subscribe to receive the aggregated air traffic and/or weather data sets in nominal real-time and/or in periodic bulk data.

As another example of a non-aircraft recipient subscribed to receive the aggregated air traffic and/or weather data sets from data aggregating system 150 in nominal real-time, an airline, aviation authority, or other enterprise may monitor the separations between the aircraft in the airspace. The enterprise may compare the aggregated air traffic and/or weather data sets with knowledge of procedural separation standards applicable to one or more target aircraft in the airspace, and may communicate to the flight crew of the target aircraft to provide recommendations to the flight crew regarding when they may likely be cleared to a more fuel-efficient or desirable altitude or heading. In some examples, this datalink advisory could be detected by the aircraft's flight management system (FMS) or other automated process or system and be presented to the flight crew of the target aircraft as a pre-optimized recommendation. The FMS may compute when the target aircraft should climb to a new altitude and the advisory service or enterprise may know when the target aircraft is likely to be able to receive a clearance to climb. Combining these two elements of information may enable the FMS to recommend a course change request such as a climb request only when the course change request is likely to be granted.

As yet another example of a non-aircraft recipient subscribed to receive the aggregated air traffic and/or weather data sets from data aggregating system 150 in real-time, an aviation authority may use this service to monitor air traffic. The aviation authority may adjust permissible procedural separation standards between aircraft to enable more fuel-efficient and denser flight traffic in accordance with the aviation authority's real-time evaluation of the aggregated air traffic and/or weather data sets, potentially in combination with additional data or external conditions.

While the example of FIGS. 1-3 shows a single integrated data aggregating system 150 hosted at a single ground station, data aggregating system 150 may take a wide variety of other forms in other implementations. For example, data aggregating system 150 may be implemented across multiple assets such as geographically distributed data centers. In other examples, data aggregating system 150 or a control interface thereof may be implemented on a single mobile device such as a laptop or smartphone. In other examples, data aggregating system 150 may be hosted on one or more aircraft, which may coincide with one or more of the aircraft described above, such as example aircraft 10, such that all of the functions of data aggregating system 150 are performed on board aircraft 10. In other examples, data aggregating system 150 may be hosted on one or more space-based assets, which may coincide with telecommunications satellite 144 and/or one or more additional satellites.

Figure 4:
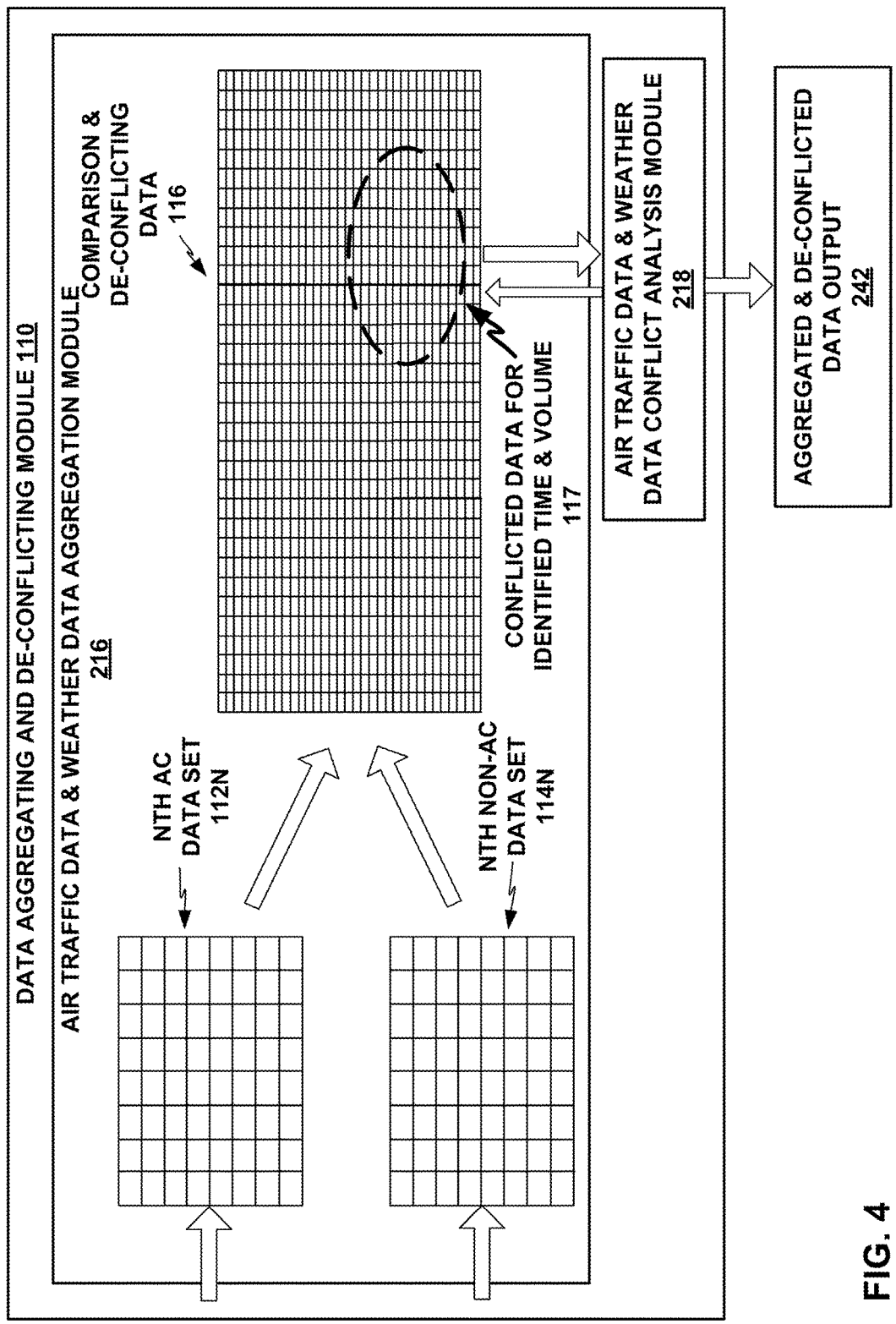
FIG. 4 depicts a conceptual block diagram of an example data aggregating and de-conflicting module aggregating and comparing aircraft data sets and non-aircraft data sets for the same or otherwise overlapping time and volume of space from various aircraft and non-aircraft data sources, verifying and de-conflicting the different data sets, and generating comparison and de-conflicting data and aggregated and de-conflicted data outputs.

FIG. 4 depicts a conceptual block diagram of an example data aggregating and de-conflicting module 110 aggregating and comparing aircraft data sets 112N and non-aircraft data sets 114N ("data sets 112N, 114N") for the same or otherwise overlapping time and volume of space from various aircraft 10-32 and non-aircraft data sources 40-60, verifying and de-conflicting the different data sets 112N, 114N, and generating comparison and de-conflicting data 116 and aggregated and de-conflicted data outputs 242 ("aggregated data outputs 242"), in accordance with one example of this disclosure. In this example, data aggregating and de-conflicting module 110 includes an air traffic data and weather data aggregation module 216 ("data aggregation module 216") and an air traffic data and weather data conflict analysis module 218 ("data conflict analysis module 218"). Air traffic data and weather data aggregation module 216 may receive sets of air traffic data and potentially also weather data referenced to specific times and volumes of space, including time and volume of space referenced aircraft air traffic data and weather radar data sets 112 (or "Nth AC data set 112N" as representatively shown in FIG. 4) and time and volume of space referenced non-aircraft air traffic data and weather radar data sets 114 (or "Nth non-AC data set 114N" as representatively shown in FIG. 4). Air traffic data and weather radar data sets 112 may be received from one or more aircraft, as discussed above with respect to FIGS. 1-3. Non-AC data sets 114 may include any data received via downlink via datalink 140, Internet 199, other broadband data connections, or any other communicative connections to data aggregating system 150, including any air traffic data, weather data, or other data received from any of non-aircraft data sources 40-60 as described above.

Data sets 112, 114 may be both time referenced and geographically referenced, such that they include identifying data or metadata matching them with certain times and volumes of space in the sky referenced by geography and altitude, of where the data were collected. These time references and geographic references in the metadata of the weather data sets 112, 114 may be included by the data collecting sources such as aircraft 10-32 and non-aircraft data sources 40-60 in their data processing prior to transmitting their data to data aggregating system 150. Data sets 112, 114 are conceptually depicted in grid form in FIG. 4 to indicate that they are geographically and altitude referenced volumetric data sets in which the data may be implemented in the form of arrays, vectors, or other ordered form that preserves the three-dimensional Earth-referenced, altitude-referenced, and time-referenced volumetric geographical form of the data, representing and referencing the time and the three-dimensional geographical volume of space from which the air traffic data and weather data sets were collected.

Data aggregation module 216 and data conflict analysis module 218 may be embodied or implemented in any form of executable software instruction code and/or general or specialized processing hardware as discussed above with reference to data aggregating and de-conflicting module 110. Data aggregating and de-conflicting module 110, including data aggregation module 216 and data conflict analysis module 218, may execute on processors 102 of a data aggregating system 150 as shown in FIG. 3, such that the functions and processes embodied and performed by data aggregating and de-conflicting module 110 may be embodied and performed by processors 102 configured by executable software instruction code corresponding to data aggregating and de-conflicting module 110 that is loaded on memory 104 and/or stored on data storage 106 as shown in FIG. 3.

Aircraft data sets 112 may include data in the form of two-dimensional or three-dimensional aircraft weather radar scanning image data from aircraft weather radar systems. Non-aircraft data sets 114 may take any of a variety of forms, and in some examples may include weather data aggregated from various different original data formats into a conforming data format as a two-dimensional or three-dimensional aircraft weather radar data format, to facilitate display on a weather data display system. Various aircraft data sets 112 and non-aircraft data sets 114 may have different resolutions and/or different signal-to-noise ratios (SNR). Individual data sets 112 and 114 may also have varying resolution and/or SNR internally across a single data set.

Data aggregation module 216 is configured to aggregate or combine air traffic data and potentially also weather data from one or more aircraft, such as any one or more of aircraft 10-32 and non-aircraft data sources 40-60, into an aggregated air traffic data set or aggregated air traffic data and weather data set. While the air traffic data may be substantially consolidated into relevant information of smaller data size from the original ADS-B data by each participating aircraft in the process of generating the respectively transmitted air traffic data, data aggregation module 216 may in some examples consolidate its combined collection of air traffic data further by checking for duplicate information from air traffic data transmitted by various aircraft with overlapping surveillance ranges, as part of or prior to combining the air traffic data from the one or more aircraft and from one or more non-aircraft data sources into an aggregated air traffic surveillance data set. Data aggregation module 216 may also confirm that the duplicate, overlapping data is mutually consistent or use the overlapping data to perform error cross-checks or error correction, such as by comparing error correction bits or aircraft data between data sets reported by multiple reporting aircraft, prior to aggregating or consolidating the duplicate data into the aggregated air traffic data set.

Data aggregation module 216 thus aggregates and compares aircraft data sets 112 and non-aircraft data sets 114. Data aggregation module 216 may identify a particular aircraft data set 112N and a particular non-aircraft data set 114N as being from the same or otherwise overlapping volume of space and the same or otherwise overlapping period of time. Data aggregation module 216 may compare air traffic data and/or weather data corresponding to individual positions in space and times according to both aircraft data set 112N and non-aircraft data set 114N, and determine whether the two different data sets 112N and 114N are in accordance with each other and confirm each other, or whether there is a discrepancy between them. There may be some measurable difference in aspects of data, such as radar reflectivity, for overlapping times and positions between data sets 112N and 114N, within nominal differentials even under ideal conditions of measuring with high resolution and high SNR. Data aggregation module 216 may account for and make allowance for nominal differentials or error significance interval bars in the data for a corresponding positions in space and point in time between data sets 112N and 114N.

Data aggregation module 216 may determine if discrepancies occur or can be measured in any one or more aspects of air traffic data or weather data, such as radar reflectivity, for the same or otherwise overlapping volume of space and period of time, that is greater than a nominal or expected differential or error interval. The nominal or expected differential or error interval may be different under different conditions or circumstances (e.g., at various distances, or for more distant weather features obscured by nearby weather features), and data aggregation module 216 may adjust its standard for evaluating differentials between the data sets based on differences in underlying conditions affecting the expected measurement error interval, based on standard techniques of signal analysis (e.g., for radar signals) and error analysis.

If data aggregation module 216 does not detect a discrepancy between an aspect of air traffic data or weather data for a same or otherwise overlapping volume of space and a same or otherwise overlapping period of time from weather data sets 112N and 114N that is greater than an expected error interval, then data aggregation module 216 may verify or confirm the corresponding portions of air traffic data and/or weather data as in accordance with each other. Data aggregation module 216 may generate an output that includes the mutually consistent data from data sets 112N and 114N, and that may indicate data sets 112N and 114N to be verified as mutually consistent.

On the other hand, if data aggregation module 216 detects a discrepancy between an aspect of air traffic data or weather data for a same or otherwise overlapping volume of space and a same or otherwise overlapping period of time from data sets 112N and 114N that is greater than an expected error interval, then data aggregation module 216 may identify and flag the corresponding portions of data from the two data sets 112N and 114N for further analysis by data conflict analysis module 218. For instance, in the example of FIG. 4, data aggregation module 216 may identify data from a specific portion of volume of space from the specific time interval from data sets 112N and 114N as having a significant discrepancy between them, identified as conflicted data 117 as a portion of aggregated data 116 in FIG. 4. Data aggregation module 216 may indicate or identify the flagged conflicted weather data 117 to data conflict analysis module 218. Data aggregation module 216 may communicate the conflicted data 117 to data conflict analysis module 218, or data conflict analysis module 118 may access the conflicted weather data 117 from the combined de-conflicting and correction data 116, or otherwise from the individual original weather data sets 112N and 114N.

Data conflict analysis module 218 may then analyze the conflicted data 117 from weather data sets 112N and 114N and evaluate which of the data sets 112N and 114N is more likely to be accurate or reliable. This may include evaluating the relative resolution of data sets 112N and 114N, evaluating the relative SNR of data sets 112N and 114N, evaluating the relative proximity to the subject air traffic or weather of the conflicted weather data 117 of the original one or more data gathering systems that obtained weather data sets 112N and 114N, evaluating the reliability or precision of the data gathering instrumentation and communication systems responsible for gathering the data sets 112N and 114N, evaluating a difference in time of data gathering of data sets 112N and 114N and to what extent the passage of time after the older of the two data sets might account for the discrepancy, and/or evaluating other potentially relevant factors.

Data aggregating system 150 may thus be configured to aggregate and de-conflict the composite air traffic radio surveillance data and the data from the one or more non-aircraft data sources comprises the system. As part of this, data aggregation module 216 of data aggregating system 150 may be configured to identify a data conflict above a nominal threshold of difference between a first set of data from a first source and a second set of data from a second source from among the composite air traffic radio surveillance data and the data from the one or more non-aircraft data sources. Data conflict analysis module 218 of data aggregating system 150 may be configured to determine a de-conflicted data set to resolve the data conflict, and to include the de-conflicted data set to cover the volume of space and time interval of the conflicted data from the first and second data sets, in place of the first set of data or the second set of data in the aggregated and de-conflicted data set 242.

In some cases, data conflict analysis module 218 determining the de-conflicted data set may include identifying one of the first and second data sets as a more reliable data set, and using the more reliable data set as the de-conflicted data set for the aggregated and de-conflicted data outputs 242. In some cases, data conflict analysis module 218 determining the de-conflicted data set may include identifying that both of the first and second data sets are of nominal reliability, and using a combination, such as a weighted average, of the first and second data sets as the de-conflicted data set for the aggregated and de-conflicted data outputs 242. In some cases, data conflict analysis module 218 may return results to data aggregation module 216 for data aggregation module 216 to perform additional aggregation, and for data aggregation module 216 potentially to return further identified data conflicts to data conflict analysis module 218, such that data aggregating system 150 may not necessarily perform aggregating and de-conflicting of the data in a definite or discrete order.

For example, data conflict analysis module 218 of data aggregating system 150 may generate a result from performing its de-conflicting analysis, based on one or more of a variety of possible factors data conflict analysis module 218 evaluates, that aircraft weather radar data from an onboard weather radar system from a particular aircraft, e.g., aircraft 32, is more accurate or more reliable for a certain volume of space, e.g., covering convective weather feature 96 shown in FIG. 1, than weather radar data for the same volume of space from certain other sources, such as aircraft 30 and ground-based weather radar station 44. For example, data conflict analysis module 218 may determine that the aircraft weather radar data from aircraft 32 was taken from more proximate to convective weather feature 96, was taken more recently, has higher resolution, has higher SNR, and/or has less intervening and interfering weather features, compared to the weather radar data for the same volume of space from aircraft 30 or ground-based weather radar station 44. As particular examples, data conflict analysis module 218 may determine that the data from aircraft 32 covering the volume of space that includes convective weather feature 96 was collected from a closer distance to the volume of space than aircraft 30 and with less intervening radar-reflective weather features compared to the data from aircraft 30, and has a higher resolution and SNR for that volume of space than the data from aircraft 30, and that the data from aircraft 32 is more recent than the data from ground-based weather radar station 44.

In some other examples, data conflict analysis module 218 of data aggregating system 150 may generate a result from performing its de-conflicting analysis, based on one or more of a variety of possible factors it evaluates, that data from several sources is of similar accuracy or resolution. For example, one or other of several aircraft and/or non-aircraft data sources may have higher resolution, have higher SNR, originate from a more proximate position, and/or originate from a more recent time, but only marginally and not enough to exceed a nominal margin of measurement error or confidence interval. In these cases, data conflict analysis module 218 may generate a de-conflicting result in which data from the multiple sources with similar accuracy is averaged or otherwise combined, or in which one or more of the data sets may be discarded as duplicative. In some examples, data conflict analysis module 218 may generate a weighted average of the multiple accurate data sets as a de-conflicting output. Data conflict analysis module 218 may thereby, for example, generate a representation of a convective weather cell with a distribution in space that is averaged in a weighted average from the multiple reliable data sets, with some weighting applied to give more weight to data sets that data conflict analysis module 218 evaluates to be marginally more reliable, e.g., by having marginally higher proximity, resolution, and/or SNR, or other confidence-enhancing factor.

For example, data conflict analysis module 218 may determine that aircraft weather radar data from aircraft 32 is marginally more reliable than aircraft weather radar data from aircraft 20 for convective weather feature 96, because data conflict analysis module 218 determines that aircraft 32 was closer to that volume of space, and its data has marginally higher resolution and SNR for that volume of space than the data from aircraft 20. Data conflict analysis module 218 may calculate a relative confidence of the aircraft data from the two aircraft, and weight the data from aircraft 32 with an accordingly greater weight in calculating a weighted average of the data from both of aircraft 20 and 32. Data conflict analysis module 218 may further apply corresponding weights to weather data covering the same volume of space and interval of time from other sources, such as weather satellite 40, weather balloon 42, and/or ground-based weather radar station 44, also based on their determined relative reliability. Data conflict analysis module 218 may generate the weighted average data output by determining a weighted average of radar reflectivity from each of the multiple weather radar data sets at each position in the volume of space to the limits of resolution of the available data, for example. The aggregated and de-conflicted data output 242 generated by data aggregating system 150 based on a weighted average of multiple data sets may thus have a higher resolution and potentially a higher accuracy than any of the underlying constituent data sets.

In some examples, data aggregating and de-conflicting module 110 may be configured to compare the aircraft data sets 112 and non-aircraft data sets 114 asynchronously from receiving, identifying, and/or storing the incoming aircraft data sets 112 and non-aircraft data sets 114, and to match the aircraft data sets 112 and the non-aircraft data sets 114 from the same or overlapping time periods and from the same or overlapping volumes of space, which may enable flexibility to take advantage of varying rates of incoming data, in some examples. In some examples, data aggregating and de-conflicting module 110 may be configured to load the aircraft data sets 112 and non-aircraft data sets 114 directly into memory 104 from first receiving aircraft data sets 112 and non-aircraft data sets 114, and to perform the comparison and de-conflicting analysis of aircraft data set 112N and non-aircraft data set 114N with the weather data sets 112N and 114N in memory 104, and with conflicted weather data 117 maintained in memory 104 during operations for the de-conflicting analysis, without necessarily storing any of the data to and then retrieving the data from data storage 106. Maintaining the relevant data in memory 104 throughout de-conflicting analysis may facilitate rapid performance of the de-conflicting analysis and rapid generation of aggregated and de-conflicted data outputs 242 in some examples. In some other examples, data aggregating and de-conflicting module 110 may make use of data storage 106 for storing and retrieving at least some data involved in performing a de-conflicting analysis, and may use a schemaless data store, a rapid access database, or other rapid data access technology to facilitate performing de-conflicting analysis and generating aggregated and de-conflicted data outputs 242 rapidly, and thereby configuring data aggregating system 150 to generate aggregated and de-conflicted outputs 242 within a nominal latency of receiving the composite air traffic radio surveillance data 112 from the one or more relaying aircraft 10, 20.

In some examples, data aggregating and de-conflicting module 110 may also store and maintain parameters or policies, such as selected error significance thresholds or data discrepancy significance thresholds that may be selected or defined by an operator or user. Data aggregating and de-conflicting module 110 may receive updates to the parameters or policies from an operator or user at times. In some examples, data aggregating and de-conflicting module 110 may also perform security, validation, and/or authentication for incoming data 112 and/or 114.

In some examples, data aggregating system 150 may also homogenize or clean up air traffic data and/or weather data from different sources according to known potentially confusing factors in the data, such as by canceling ground surface feature reflections from weather radar data or other weather data, if such canceling was not previously done by the supplying data source, prior to performing a de-conflicting analysis. For example, data aggregating system 150 may have access to a global database or other data store of ground surface physical geography for the ground surface of the Earth or substantial areas thereof. Data aggregating system 150 may then compare weather radar components of the weather data sets received from at least one of the weather data sources with the data store of ground surface physical geography, and cancel radar reflection data from ground surfaces from the weather radar components of the received weather data, based at least in part on the comparing of the one or more weather radar components of the received weather data with the data store of ground surface physical geography, prior to performing a de-conflicting analysis. That is, portions of received weather radar data from one or more weather radar data sources may be due to radar reflections from ground surfaces rather than from weather features, and comparison of the weather radar data with the ground surface geography data store by data aggregating system 150 may enable data aggregating system 150 to cancel out this ground surface data as part of its process of performing a de-conflicting analysis, to reduce or eliminate known obfuscating factors from a comparison of different weather data sets.

In some examples, data aggregating and de-conflicting module 110 may identify a particular weather feature such as a convective weather cell in the weather data sets 112N and 114N that corresponds to conflicted weather data 117. In one example, data aggregating and de-conflicting module 110 may identify conflicted weather data 117 with convective weather cell 396 as shown in FIG. 1, as further described below with reference to FIGS. 5 and 6.

Figure 5:
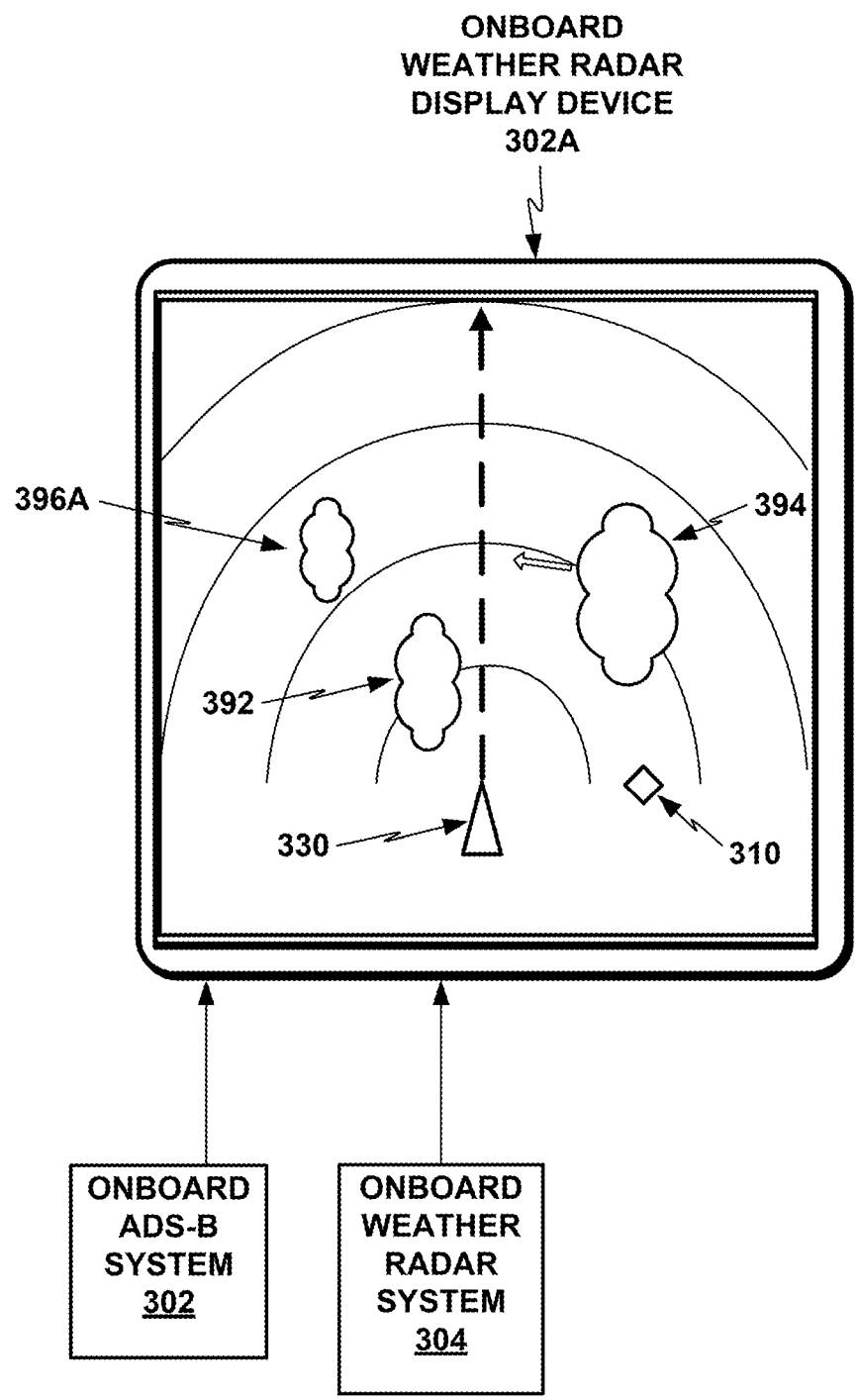
FIG. 5 depicts a conceptual diagram of an example onboard electronic weather display device displaying air traffic data and weather data from an onboard weather radar system, prior to receiving aggregated and de-conflicted data from a weather data aggregating system.

FIG. 5 depicts a conceptual diagram of an example onboard electronic weather display device 302A displaying example air traffic data and weather data from an onboard weather radar system 304, prior to receiving aggregated and de-conflicted data from a data aggregating system 150. Onboard electronic weather display device 302A may be part of the cockpit equipment of aircraft 30 or another type of display onboard aircraft 30 or external to aircraft 30. Onboard electronic weather display device 302A depicts (in a horizontal view, e.g., a slice taken at a particular altitude) weather feature representations 392, 394, 396A, and aircraft icon 310 that correspond to convective weather features 92, 94, 96 and aircraft 10, respectively, shown in FIG. 1, according to air traffic surveillance data (e.g., ADS-B data from aircraft 10) and weather radar data that aircraft 30 has collected from its own instruments, e.g., its own ADS-B system and onboard radar system, and prior to receiving data from data aggregating system 150.

Figure 6:
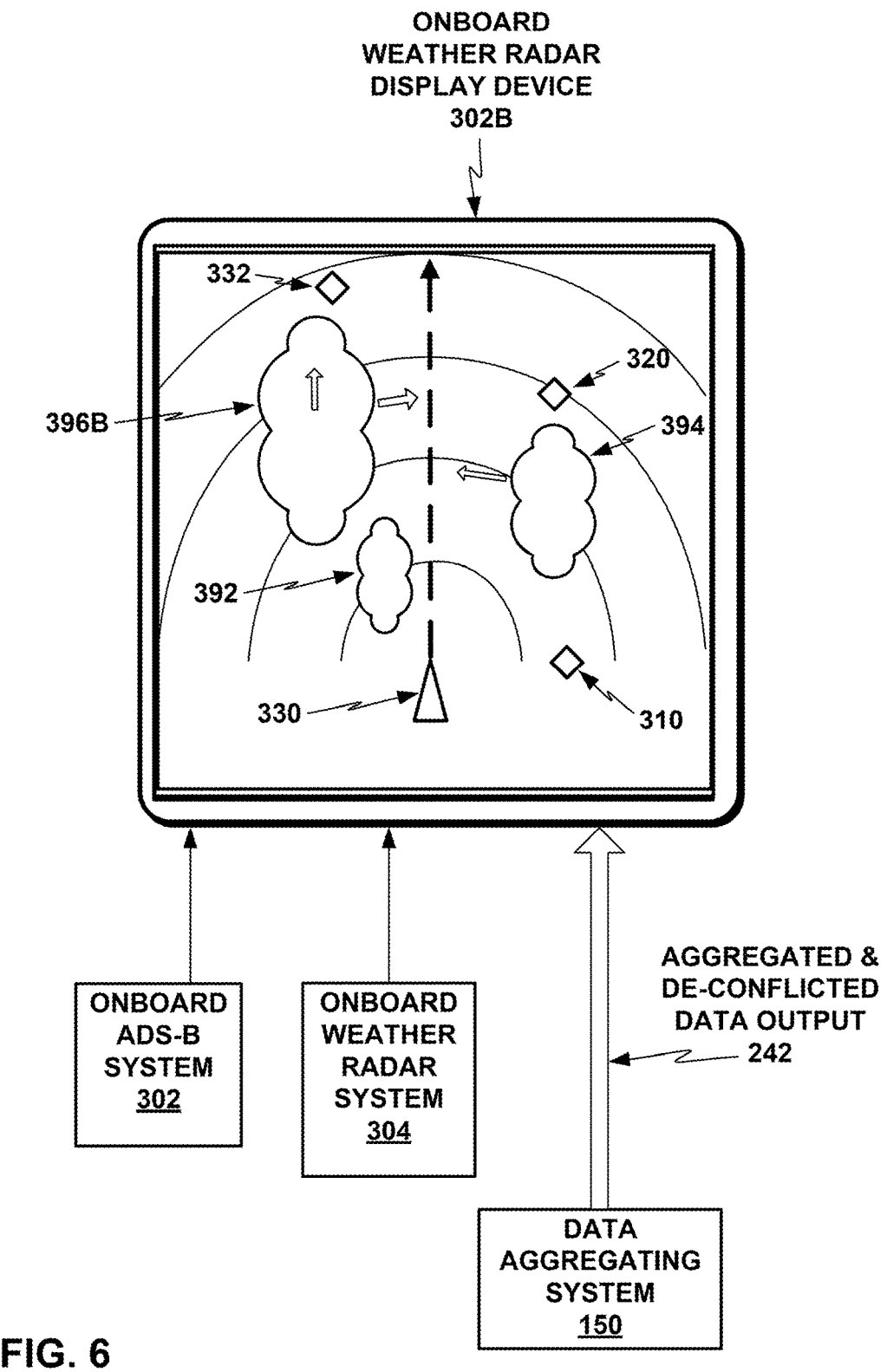
FIG. 6 depicts a conceptual diagram of an example onboard electronic weather display device, displaying air traffic data and weather data from an aggregated and de-conflicted air traffic and weather data output from a data aggregating system.

FIG. 6 depicts a conceptual diagram of an example onboard electronic weather display device 302B, displaying example air traffic data and weather data from aggregated and de-conflicted air traffic and weather data output 242 from data aggregating system 150. Electronic weather display device 302B may be the same display device as onboard electronic weather display device 302A onboard aircraft 30 as shown in FIG. 5 except after aircraft 30 has received aggregated data output 242 from data aggregating system 150. Onboard electronic weather display device 302B depicts (in a horizontal view) weather feature representations 392, 394, 396B and aircraft icons 310, 320, and 332 that correspond to convective weather features 92, 94, 96 and aircraft 10, 20, and 32, respectively, as shown in FIG. 1, according to aggregated and de-conflicted data output 242 from data aggregating system 150. The display shown by onboard electronic weather display device 302B in FIG. 6 may incorporate aggregated data output 242 from data aggregating system 150 in addition to or instead of data from the aircraft's onboard ADS-B and weather radar systems.

Aircraft 20 and 32 may have been out of ADS-B range of aircraft 30, or the ADS-B signals from aircraft 20 and 32 may have been attenuated by intervening weather, such that aircraft 30 did not have air traffic data on aircraft 20 and 32 from its own systems. Thus, the systems onboard aircraft 30 may not have been aware of the locations of aircraft 20, 32. However, based on aggregated and de-conflicted data output 242, the systems onboard aircraft 30 are now aware of the locations of aircraft 20, 32. Aircraft icons 320 and 332 representing aircraft 20 and 32 in the display shown in FIG. 6 are based on ADS-B data from aircraft 20, both for its own air traffic data and air traffic data from aircraft 32 that aircraft 20 relays to data aggregating system 150, as incorporated in aggregated data output 242 from data aggregating system 150.

The display based on aggregated and de-conflicted data output 242 from data aggregating system 150 also includes weather feature representation 396B as a de-conflicted and corrected depiction of convective weather feature 96 in place of weather feature representation 396A based on incomplete data from the onboard weather radar system of aircraft 30. For example, the radar signals from aircraft 30 covering convective weather feature 96 may have been obscured by intervening radar-reflective weather features such as convective weather feature 92. The additional and de-conflicted data on convective weather feature 96 may include weather radar data from any one or more of aircraft 20, aircraft 32, and/or any of various non-aircraft sources as described above. The additional and de-conflicted data on convective weather feature 96 results in a more complete and more accurate characterization of convective weather feature 96 in the form of weather feature representation 396B displayed on electronic weather display device 302B as shown in FIG. 6, including depictions of a larger size, a lateral motion, and a vertical growth trend of convective weather feature 96.

In some examples, data aggregating system 150 may also include in aggregated data output 242 an explicit indication or alert (not shown in FIG. 6) for display on electronic weather display device 302B pointing out areas of the display where the aggregated data output 242 is conflicted with the data from the aircraft's own systems, above a nominal threshold of conflict or difference. The indication or alert of the conflict may include graphical elements to emphasize the conflict, such as highlighting or different colors superimposed on areas representing conflicted data, e.g., aircraft icons 320 and 332 and weather feature representation 396B.

In some examples, data aggregating system 150 may determine a portion of its complete aggregated and de-conflicted data that covers the position and predicted trajectory of a particular recipient or is otherwise relevant to a particular recipient such as aircraft 30, and transmit only that selected or relevant portion of the entire available aggregated and de-conflicted data as an aggregated data output 242 to aircraft 30. This may include air traffic data and weather data within a minimum distance of the selected aircraft, e.g., within a radius of at least 150 nautical miles. In some examples, a subscriber or other recipient may have user settings or account settings configured to specify certain portions of aggregated and de-conflicted data to receive from data aggregating system 150, such as a certain geographic region, or covering the aircraft in a certain fleet. For example, an airline or other aircraft fleet operator may contract in a subscriber agreement for aggregated and de-conflicted data coverage of all the aircraft in its fleet.

Data aggregating system 150 may thus be configured to identify a portion of the aggregated and de-conflicted data set that provides coverage for a selected aircraft, a selected aircraft fleet operator, a selected air traffic control authority, or a selected region (e.g., a remote region such as over an ocean, polar region, or major desert), and generate an aggregated and de-conflicted data output based on a portion of the aggregated and de-conflicted data set that data aggregating system 150 determines provides coverage for the selected aircraft, selected aircraft fleet operator, selected air traffic control authority, or selected remote region. An individual aircraft pilot or flight crew, an aircraft fleet operator, an air traffic control authority, or an authority or entity interested in a particular region may license or otherwise enter agreement to become a recipient of data from data aggregating system 150. In some cases, data aggregating system 150 may determine a particular static region designated as a region of interest or of coverage by an air traffic authority, or data aggregating system 150 may dynamically determine a position of a particular aircraft or positions of a number of particular aircraft owned or managed by an aircraft fleet operator. Data aggregating system 150 may then select and send, to such recipients, aggregated and de-conflicted air traffic data and potentially also weather data targeted to provide specific coverage for a particular aircraft, for some or all of the aircraft of a particular aircraft fleet operator, for some or all of the aircraft in the airspace controlled by a particular air traffic control authority, or for some or all of the aircraft in a particular region. An aircraft, aircraft fleet operator, air traffic control authority, or other entity may thus benefit from aggregated and de-conflicted air traffic data and weather data provided by data aggregating system 150 specific to their position, the positions of their assets, or their region of interest.

Data aggregating system 150 may uplink aggregated data output 242 to aircraft 30 in the form of an entire data set for the position and trajectory of aircraft 30 to provide the data for display as shown in FIG. 6, in some examples. In other examples, data aggregating system 150 may determine what differences there are between its aggregated and de-conflicted data for the position and trajectory of aircraft 30 and the data aircraft 30 already has from its own systems, and data aggregating system 150 may prepare and transmit to aircraft 30 a data set consisting only of data differentials between the aggregated and de-conflicted data generated by data aggregating system 150 and the data already available to aircraft 30 from its own onboard systems (e.g., the onboard ADS-B system and onboard weather radar system of aircraft 30). For example, the differential data may include contour lines or a geometrical center of a weather system defined by a displacement to a baseline reference from the weather data generated by the onboard weather radar system of aircraft 30. In some examples, the differential data for the corrective output may be a differential value or correction value in reflectivity strength, vertical trend, lateral moving vectors, ambient temperature updates, or a combination of the above and/or other weather data values for weather features. Electronic weather display device 302B onboard aircraft 30 may be equipped to superimpose or otherwise combine the differential data it receives from data aggregating system 150 with its own data from the systems onboard aircraft 30 to transform its data into the aggregated and de-conflicted data as represented in the display shown in FIG. 6.

Figure 7:
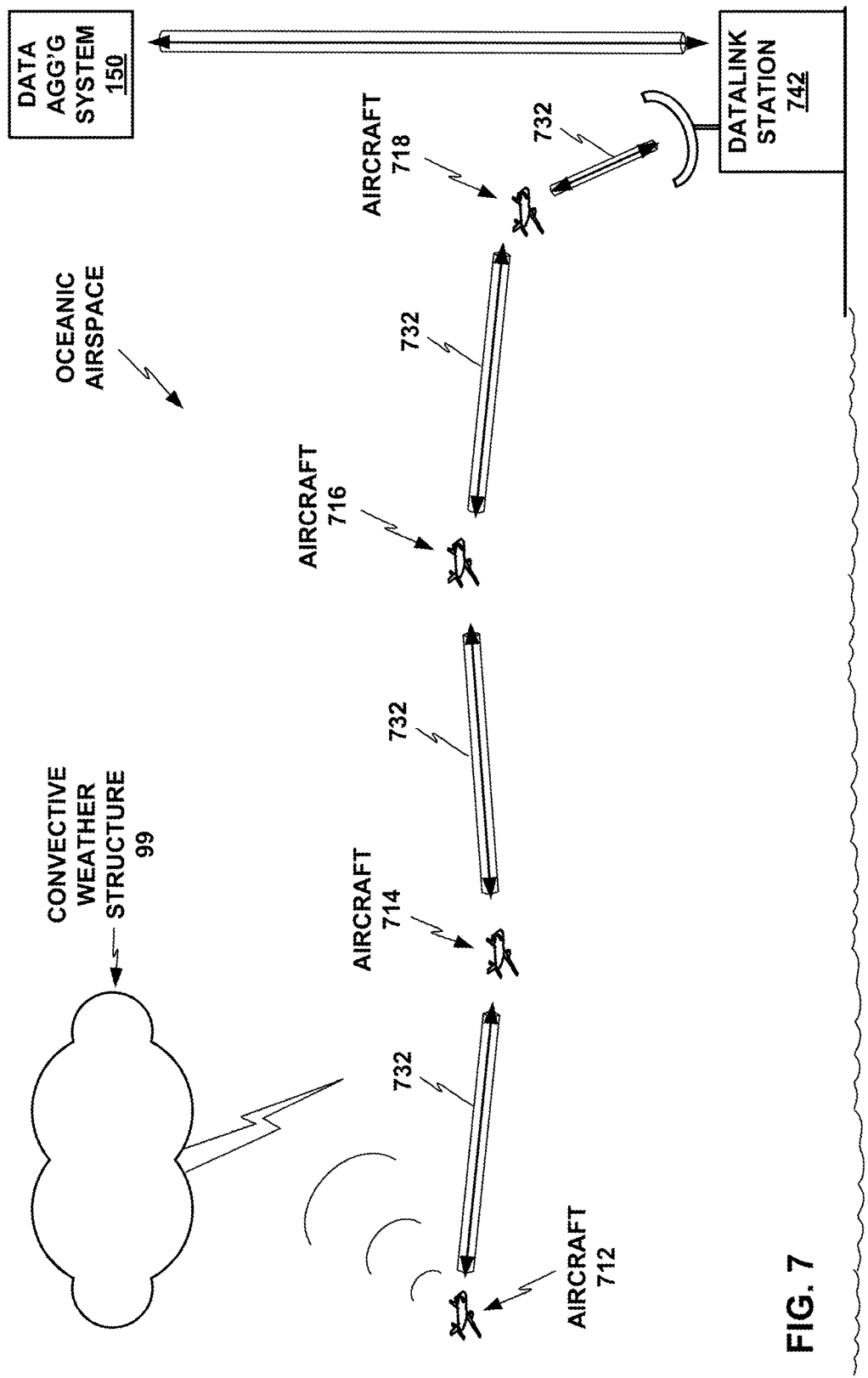
FIG. 7 shows another view of an example remote oceanic airspace with various aircraft in flight that transmit and relay air traffic and weather data to each other and thereby to a data aggregating system via a datalink station.

FIG. 7 shows another view of an example remote oceanic airspace with various aircraft 712, 714, 716, 718 in flight that transmit and relay air traffic and weather data to each other and thereby to data aggregating system 150 via a datalink station 742, which may be analogous to datalink station 142 as described above. Aircraft 712, 714, and 716 may be out of datalink range of a datalink service but within ADS-B range of each other and aircraft 718, respectively, while aircraft 718 may be close to the coast and in range of datalink station 742, which may be positioned in a coastal area near an edge of a continent. Aircraft 714, 716, and 718 may thus relay ADS-B air traffic data and weather data from aircraft 712, 714, and 716 to data aggregating system 150. Aircraft 712, 714, and 716 may be in remote airspace over the high ocean and out of range of conventional ADS-B air traffic receiving ground stations, yet be able to convey their ADS-B air traffic data to ground-based datalink station 742 and data aggregating system 150 by relayed datalink through each other's ADS-B systems configured in accordance the devices, systems, and techniques of this disclosure.

For example, aircraft 712 and 714 may be within close, high-resolution radar range of convective weather feature 99, such that their relayed weather data may be used by data aggregating system 150 to incorporate a high-resolution characterization of convective weather feature 99 in its aggregated and de-conflicted data outputs. Data aggregating system 150 may also receive data from non-aircraft sources and aggregate the non-aircraft data with the aircraft data as described above.

While FIG. 7 depicts a simplified view, in other examples, hundreds, thousands, or any number or aircraft in remote airspaces may relay data through each other to data aggregating system 150. For example, large numbers of aircraft may be spaced at regular intervals over an ocean in a track system such as the North Atlantic Track System (NATS) in which each aircraft may be within ADS-B transmission range of at least one other aircraft ahead or behind it in a track in the oceanic airspace. In this example, many or all of the aircraft aligned in a track system during periods of normal air traffic may be within Nth-degree data relay range of data aggregating system 150. Data aggregating system 150 may also receive data from non-aircraft sources and aggregate the non-aircraft data with the aircraft data as described above. Data aggregating system 150 may thus aggregate and de-conflict air traffic data and weather data from large numbers of aircraft including potentially many or all aircraft in flight in a track system over an ocean. Data aggregating system 150 may thus provide highly reliable and high-resolution air traffic data and weather data covering large regions of the remote airspace.

Figure 8:
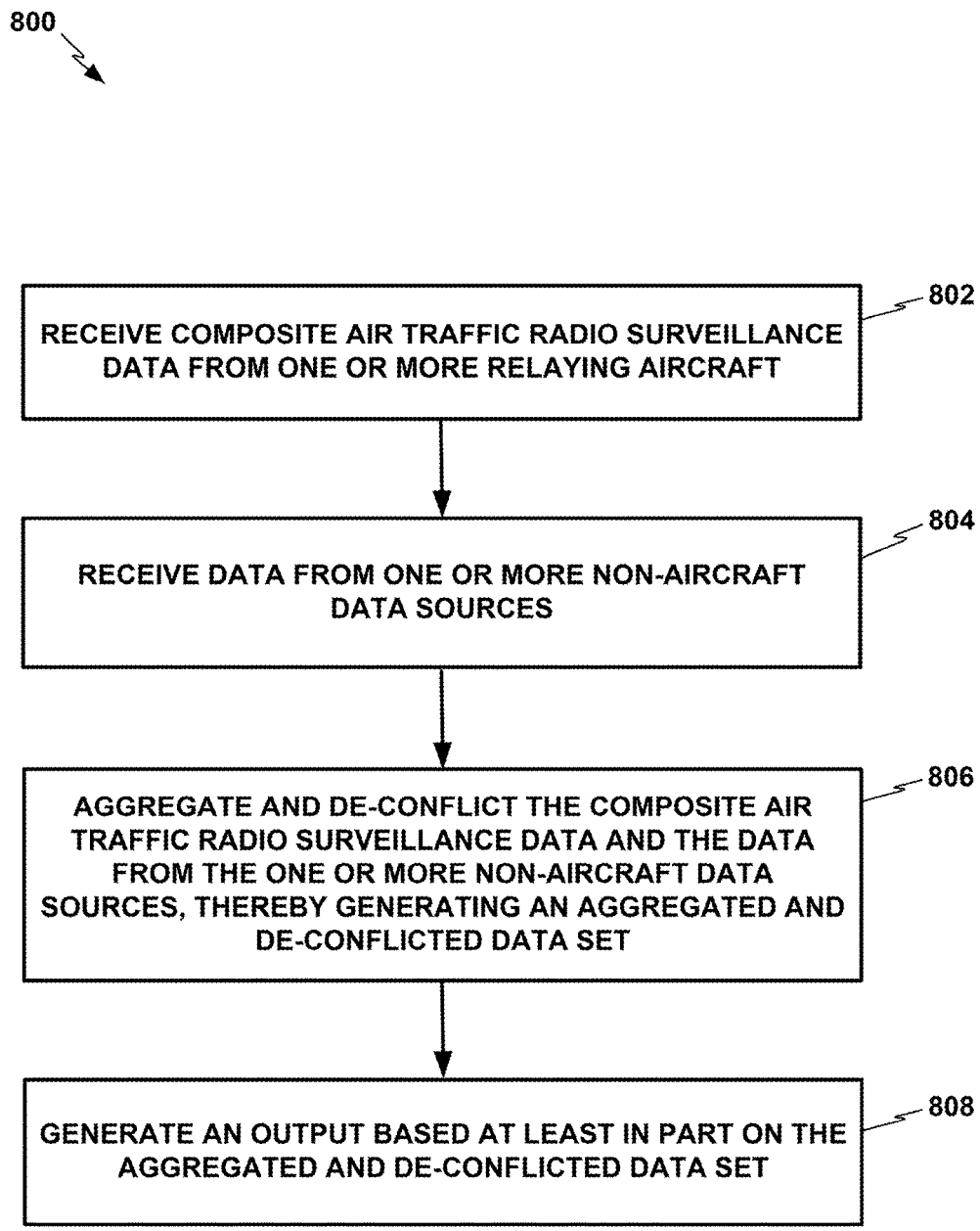
FIG. 8 shows a flowchart for an example method for aggregating and de-conflicting air traffic data and potentially also weather data and other data, as may be implemented, performed, executed, and/or embodied by a data aggregating system in various examples of this disclosure.

FIG. 8 shows a flowchart for an example method 800 for aggregating and de-conflicting air traffic data and potentially also weather data and other data, as may be implemented, performed, executed, and/or embodied by a data aggregating system 150 in various examples of this disclosure. Although method 800 is described with respect to one or more processors 102, in other examples, any part of method 800 may be performed by one or more processors of another device. In accordance with method 800, one or more processors 102 receive composite air traffic radio surveillance data from one or more relaying aircraft, e.g., wherein the composite air traffic radio surveillance data comprises air traffic radio surveillance data from the one or more relaying aircraft and air traffic radio surveillance data relayed by the one or more relaying aircraft from one or more additional aircraft (e.g., data aggregating system 150 receiving air traffic data and weather data from aircraft 10 and 20, including data originated by aircraft 10 and 20 and data relayed by aircraft 10 and 20 from aircraft 30 and 32, as in the examples of FIG. 1-6, or data aggregating system 150 receiving air traffic data and weather data from aircraft 718, including data originated by aircraft 718 and data relayed by aircraft 718 from aircraft 712, 714, and 716 as in the example of FIG. 7) (802). One or more processors 102 may also receive data from one or more non-aircraft data sources (e.g., data aggregating system 150 receiving air traffic data, weather data, and/or other data from non-aircraft data sources 40-60) (804).

One or more processors 102 may aggregate and de-conflict the composite air traffic radio surveillance data and the data from the one or more non-aircraft data sources, thereby generating an aggregated and de-conflicted data set (e.g., data aggregating system 150 aggregating and de-conflicting air traffic data and potentially also weather data or other data from aircraft 10-32 and non-aircraft data sources 40-60 as in the examples of FIGS. 1-6; data aggregation module 216 and data conflict analysis module 218 of data aggregating and de-conflicting module 110 of data aggregating system 150 aggregating and de-conflicting air traffic data and potentially also weather data or other data from aircraft data sets 112 and non-aircraft data sets 114 as in the example of FIGS. 3 and 4; data aggregating system 150 generating aggregated and de-conflicted data outputs based on data collected from aircraft 712-718 as in the example of FIG. 7) (806).

One or more processors 102 may generate an output based at least in part on the aggregated and de-conflicted data set (e.g., data aggregating system 150 generating aggregated and de-conflicted data outputs 242 based on data aggregated from aircraft 10-32 and non-aircraft data sources 40-60 as in the examples of FIGS. 1-6; data aggregation module 216 and data conflict analysis module 218 of data aggregating and de-conflicting module 110 of data aggregating system 150 generating aggregated and de-conflicted data outputs 242 as a result of aggregating and de-conflicting air traffic data and potentially also weather data or other data from aircraft data sets 112 and non-aircraft data sets 114 as in the example of FIGS. 3 and 4; data aggregating system 150 generating aggregated and de-conflicted data outputs 242 for display on onboard electronic weather display device 302B on aircraft 30 as in the example of FIGS. 5 and 6; data aggregating system 150 generating aggregated and de-conflicted data outputs based on data aggregated from aircraft 712-718 and from non-aircraft data sources as in the example of FIG. 7 as in the example of FIG. 7) (808).

In data aggregating system 150, the processors 102, memory 104, data storage 106, and communication interface 108 are interconnected by communication channels 109, such as a bus or communication fabric, for transporting data and instruction code between processors 102, memory 104, and data storage 106. Processors 102 may include one or more central processing units (CPUs), one or more CPU cores, one or more graphical processing units (GPUs), or any other type of processing units. Memory 104 may include any form of working memory, such as any form of random access memory (RAM). Data storage 106 may include any form of hard disc drives, redundant array of independent discs (RAID), Flash drives, cloud storage, or any other form of data storage, and may host any form of databases, schemaless data stores, or any type of data stores. Data aggregating system 150 may process incoming data and outgoing data via communication interface 108, which may include or be operatively coupled to interface subsystems and transceivers for managing data communications via datalink service 140.

The techniques of this disclosure, attributed to data aggregating system 150 or other elements, may be implemented in a device or article of manufacture comprising a computer-readable storage medium. The term "processor," as used herein may refer to any of the foregoing structure or any other structure suitable for processing program code and/or data or otherwise implementing the techniques described herein. Elements of data aggregating system 150 and/or processors 102 thereof, and/or system elements for executing and/or storing data aggregating and de-conflicting module 110 or features thereof as disclosed above, may be implemented in any of a variety of types of solid state circuit elements, such as CPUs, CPU cores, GPUs, digital signal processors (DSPs), application-specific integrated circuits (ASICs), a magnetic nonvolatile RAM or other types of memory, a mixed-signal integrated circuit, a field programmable gate array (FPGA), a microcontroller, a programmable logic controller (PLC), a programmable logic device (PLD), a complex programmable logic device (CPLD), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 104 may include any volatile or non-volatile media, such as a RAM, ROM, non-volatile RAM (NVRAM), electrically erasable programmable ROM (EEPROM), flash memory, and the like. One or more memory devices 104 may store computer readable instructions that, when executed by one or more processors 102, cause the one or more processors 102 to implement the techniques attributed herein to data aggregating and de-conflicting module 110.

Elements of data aggregating and de-conflicting module 110 may be programmed with various forms of software. Weather data aggregating module 110 may be implemented at least in part as, or include, one or more executable applications, application modules, libraries, classes, methods, objects, routines, subroutines, firmware, and/or embedded code, for example. Elements of data aggregating and de-conflicting module 110 as in any of the examples herein may be implemented as a device, a system, an apparatus, and may embody or implement a method of comparing and de-conflicting weather data from multiple sources and generating weather data correction outputs, including for implementing example method 800 as described with reference to FIG. 8. Data aggregating and de-conflicting module 110 may configure processors 102 to receive composite air traffic radio surveillance data from one or more relaying aircraft, wherein the composite air traffic radio surveillance data comprises air traffic radio surveillance data from one or more relaying aircraft and air traffic radio surveillance data relayed by the one or more relaying aircraft from one or more additional aircraft; receive data from one or more non-aircraft data sources; aggregate and de-conflict the composite air traffic radio surveillance data and the data from the one or more non-aircraft data sources, thereby generating an aggregated and de-conflicted data set; generate an output based at least in part on the aggregated and de-conflicted data set; and to perform any other functions described herein.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft). "Weather information" may be considered to be a form of and included in "weather data" for purposes of this disclosure. While some examples are described in terms of data aggregating system 150 aggregating air traffic data and weather radar data from various aircraft and non-aircraft data sources, in other examples, data aggregating system 150 may aggregate, compare, verify, and/or de-conflict weather data from any two or more sources, and generate aggregated and de-conflicted or corrected outputs based on aggregating, comparing, verifying, and/or de-conflicting or correcting air traffic data and/or weather data and/or other data from any two or more sources. Data aggregating system 150 may communicate such aggregated and de-conflicted or corrected outputs to any of a variety of receiving systems for any of a variety of useful applications.

Various illustrative aspects of the disclosure are described above. These and other aspects are within the scope of the following claims.

What is claimed is:

1. A system comprising:
a communication interface; and
one or more processors configured to:
receive, via the communication interface, a set of data comprising composite air traffic radio surveillance data from one or more relaying aircraft and composite weather data from the one or more relaying aircraft, wherein the composite air traffic radio surveillance data comprises air traffic radio surveillance data from the one or more relaying aircraft and air traffic radio surveillance data relayed by the one or more relaying aircraft from one or more additional aircraft, wherein the composite weather data comprises weather data from the one or more relaying aircraft and weather data relayed by the one or more relaying aircraft from one or more additional aircraft, and wherein the one or more processors are configured to receive the set of data at a time when at least one of the one or more additional aircraft are out of range of any ground-based station,
receive, via the communication interface, data from one or more non-aircraft data sources,
aggregate and de-conflict the set of data and the data from the one or more non-aircraft data sources to generate an aggregated and de-conflicted data set, wherein to aggregate and de-conflict the set of data, the one or more processors are configured to:
identify a data conflict above a nominal threshold of difference between a first set of data from a first source and a second set of data from a second source, wherein the first source comprises a relaying aircraft of the one or more relaying aircraft, an additional aircraft of the one or more additional aircraft, or a non-aircraft data source of the one or more non-aircraft data sources, and wherein the second source comprises a relaying aircraft of the one or more relaying aircraft, an additional aircraft of the one or more additional aircraft, or a non-aircraft data source of the one or more non-aircraft data sources;

identify one of the first set of data from the first source and the second set of data from the second source as a more reliable data set;

determine, based on the identification of the more reliable data set, a de-conflicted data set to resolve the data conflict; and include the de-conflicted data set in the aggregated and de-conflicted data set; and generate an output based at least in part on the aggregated and de-conflicted data set.

2. The system of claim 1, wherein the data from the one or more non-aircraft data sources comprises weather data, the aggregated and de-conflicted data set comprising data from the weather data from the one or more non-aircraft data sources.

3. The system of claim 1, wherein the data from the one or more non-aircraft data sources comprises air traffic data, the aggregated and de-conflicted data set comprising data from the air traffic data from the one or more non-aircraft data sources.

4. The system of claim 3, wherein the air traffic data from the one or more non-aircraft data sources comprises air traffic data from an air traffic control authority.

5. The system of claim 3, wherein the air traffic data from the one or more non-aircraft data sources comprises air traffic data from a flight tracking service.

6. The system of claim 1, wherein the one or more processors are further configured to:
identify a portion of the aggregated and de-conflicted data set that provides coverage for a selected region, and
generate the output based on the portion of the aggregated and de-conflicted data set that provides coverage for the selected region.

7. The system of claim 1, wherein the one or more processors are further configured to:
identify a portion of the aggregated and de-conflicted data set that provides coverage for a selected aircraft, and
generate the output based on the portion of the aggregated and de-conflicted data set that provides coverage for the selected aircraft.

8. The system of claim 1, wherein the one or more processors are further configured to:
identify a portion of the aggregated and de-conflicted data set that provides coverage for a selected aircraft fleet operator, and
generate the output based on the portion of the aggregated and de-conflicted data set that provides coverage for the selected aircraft fleet operator.

9. The system of claim 1, wherein the one or more processors are further configured to:
identify a portion of the aggregated and de-conflicted data set that provides coverage for a selected air traffic control authority, and
generate the output based on the portion of the aggregated and de-conflicted data set that provides coverage for the selected air traffic control authority.

10. The system of claim 1, wherein the received composite air traffic surveillance data comprises at least one of: a latitude, a longitude, a flight identifier, a range, a bearing, a ground track, a ground speed, and an altitude, for at least one of the relaying aircraft and at least one of the additional aircraft.

11. The system of claim 1, wherein the one or more processors are configured to determine the de-conflicted data set by at least identifying that both of the first and second data sets are of nominal reliability, and using a combination of the first and second data sets as the de-conflicted data set.

12. The system of claim 1, wherein the one or more processors are further configured to receive the set of data via one or more datalink channels.

13. The system of claim 1, wherein the one or more processors are further configured to generate the output within a nominal latency of receiving the set of data from the one or more relaying aircraft.

14. A method comprising:
receiving a set of data comprising composite air traffic radio surveillance data from one or more relaying aircraft and composite weather data from the one or more relaying aircraft, wherein the composite air traffic radio surveillance data comprises air traffic radio surveillance data from one or more relaying aircraft and air traffic radio surveillance data relayed by the one or more relaying aircraft from one or more additional aircraft, wherein the composite weather data comprises weather data from the one or more relaying aircraft and weather data relayed by the one or more relaying aircraft from one or more additional aircraft, and wherein at least one of the one or more additional aircraft are out of range of a ground-based station at a time when the set of data is received from the one or more additional aircraft by the one or more relaying aircraft;

receiving, with one or more processors, data from one or more non-aircraft data sources;

aggregating and de-conflicting, with the one or more processors, the set of data and the data from the one or more non-aircraft data sources to generate an aggregated and de-conflicted data set, wherein aggregating and de-conflicting comprises:
identifying a data conflict above a nominal threshold of difference between a first set of data from a first source and a second set of data from a second source, wherein the first source comprises a relaying aircraft of the one or more relaying aircraft, an additional aircraft of the one or more additional aircraft, or a non-aircraft data source of the one or more non-aircraft data sources, and wherein the second source comprises a relaying aircraft of the one or more relaying aircraft, an additional aircraft of the one or more additional aircraft, or a non-aircraft data source of the one or more non-aircraft data sources;
identifying one of the first set of data from the first source and the second set of data from the second source as a more reliable data set;
determining, based on the identification of the more reliable data set, a de-conflicted data set to resolve the data conflict; and
including the de-conflicted data set in the aggregated and de-conflicted data set; and generating, with the one or more processors, an output based at least in part on the aggregated and de-conflicted data set.

15. The method of claim 14, wherein the data from the one or more non-aircraft data sources comprises air traffic data and weather data, the method further comprising:
aggregating and de-conflicting the set of data from the one or more relaying aircraft and the air traffic radio surveillance data and the weather data from the one or more non-aircraft data sources, the aggregated and de-conflicted data set comprising data from the set of data from the one or more relaying aircraft, data from the air traffic data from the one or more non-aircraft data sources, and data from the weather data from the one or more non-aircraft data sources.

16. A system comprising:

means for receiving a set of data comprising composite air traffic radio surveillance data from one or more relaying aircraft and composite weather data from the one or more relaying aircraft, wherein the composite air traffic radio surveillance data comprises air traffic radio surveillance data from one or more relaying aircraft and air traffic radio surveillance data relayed by the one or more relaying aircraft from one or more additional aircraft, wherein the composite weather data comprises weather data from the one or more relaying aircraft and weather data relayed by the one or more relaying aircraft from one or more additional aircraft, and wherein at least one of the one or more additional aircraft are out of range of a ground-based station at a time when the set of data is received from the one or more additional aircraft by the one or more relaying aircraft;

means for receiving data from one or more non-aircraft data sources;

means for aggregating and de-conflicting the set of data and the data from the one or more non-aircraft data sources to generate an aggregated and de-conflicted data set, wherein the means for aggregating and de-conflicting comprises:

means for identifying a data conflict above a nominal threshold of difference between a first set of data from a first source and a second set of data from a second source, wherein the first source comprises a relaying aircraft of the one or more relaying aircraft, an additional aircraft of the one or more additional aircraft, or a non-aircraft data source of the one or more non-aircraft data sources, and wherein the second source comprises a relaying aircraft of the one or more relaying aircraft, an additional aircraft of the one or more additional aircraft, or a non-aircraft data source of the one or more non-aircraft data sources;

means for identifying one of the first set of data from the first source and the second set of data from the second source as a more reliable data set;

means for determining, based on the identification of the more reliable data set, a de-conflicted data set to resolve the data conflict; and means for including the de-conflicted data set in the aggregated and de-conflicted data set; and means for generating an output based at least in part on the aggregated and de-conflicted data set.

17. The system of claim 16, wherein the system further comprises:

means for receiving air traffic data and weather data from the one or more non-aircraft data sources; and means for aggregating and de-conflicting the set of data from the one or more relaying aircraft and the air traffic radio surveillance data and the weather data from the one or more non-aircraft data sources, such that the aggregated and de-conflicted data set comprises data from the set of data from the one or more relaying aircraft, data from the air traffic data from the one or more non-aircraft data sources, and data from the weather data from the one or more non-aircraft data sources.

18. The method of claim 14, further comprising:

identifying a portion of the aggregated and de-conflicted data set that provides coverage for a selected region; and generating the output based on the portion of the aggregated and de-conflicted data set that provides coverage for the selected region.

19. The method of claim 14, further comprising:

identifying a portion of the aggregated and de-conflicted data set that provides coverage for a selected aircraft; and generating the output based on the portion of the aggregated and de-conflicted data set that provides coverage for the selected aircraft.

20. The method of claim 14, further comprising:

identifying a portion of the aggregated and de-conflicted data set that provides coverage for a selected aircraft fleet operator; and generating the output based on the portion of the aggregated and de-conflicted data set that provides coverage for the selected aircraft fleet operator.

* * * * *